(12) United States Patent
Harrison

(10) Patent No.: US 8,539,072 B1
(45) Date of Patent: Sep. 17, 2013

(54) GENERATION OF A TARGETED ADVERTISEMENT IN AN UNTRUSTED SANDBOX BASED ON A PSUEDONYM

(75) Inventor: David A. Harrison, San Francisco, CA (US)

(73) Assignee: Free Stream Media, Inc., San Francisco, CA (US)

( * ) Notice: Subject to any disclaimer, the term of this patent is extended or adjusted under 35 U.S.C. 154(b) by 0 days.

(21) Appl. No.: 13/470,814

(22) Filed: May 14, 2012

Related U.S. Application Data

(63) Continuation of application No. 12/592,377, filed on Nov. 23, 2009, now Pat. No. 8,180,891.

(60) Provisional application No. 61/118,286, filed on Nov. 26, 2008.

(51) Int. Cl.
*G06F 15/173* (2006.01)
(52) U.S. Cl.
USPC ............................ 709/224; 709/226; 709/229
(58) Field of Classification Search
None
See application file for complete search history.

(56) References Cited

U.S. PATENT DOCUMENTS

| 6,836,888 | B1 | 12/2004 | Basu et al. | |
|---|---|---|---|---|
| 7,028,033 | B2 * | 4/2006 | Bright et al. | ........................ 1/1 |
| 7,873,716 | B2 | 1/2011 | Maes | |
| 2002/0116549 | A1 * | 8/2002 | Raffaele et al. | .............. 709/330 |
| 2003/0229765 | A1 | 12/2003 | Suzuoki et al. | |
| 2012/0260184 | A1 | 10/2012 | Dawes et al. | |

FOREIGN PATENT DOCUMENTS

EP       2188794 A1    5/2010

* cited by examiner

*Primary Examiner* — Mohamed Ibrahim
(74) *Attorney, Agent, or Firm* — Raj Abhyanker, P.C.

(57) ABSTRACT

Particular embodiments permit a computer program running within a security sandbox to discover and communicate with networked services for example print servers, or remote control programming interfaces for TVs, stereos, and game boxes. The sandbox allows the computer program to originate unicast connections to a limited set of hosts but otherwise provides no access to the network. Particular embodiments may require no prior install, zero configuration, no account names or passwords, and yet resists spam. This is achieved by using centralized global infrastructure to coordinate the communications rather than local multicast, anycast, or datalink broadcast.

20 Claims, 21 Drawing Sheets

GENERATION OF A TARGETED ADVERTISEMENT IN AN UNTRUSTED SANDBOX BASED ON A PSUEDONYM

CROSS REFERENCE TO RELATED APPLICATIONS

This application is a continuation of U.S. patent application Ser. No. 12/592,377 titled "Discovery, Access Control, and Communication with Networked Services from within a Security Sandbox," filed Nov. 23, 2009, which claims priority under 35 USC §119(e) to U.S. Provisional Application No. 61/118,286 titled "Discovery, Access Control, and Communication with Networked Services from within a Security Sandbox," filed on Nov. 26, 2008, the entirety of each of which is herein incorporated by reference in its entirety.

BACKGROUND OF THE INVENTION

Field of the Invention

Particular embodiments are in the technical field of networking technology. More particularly, particular embodiments are in the technical field of computer and embedded device communications.

The Internet and home entertainment devices usually do not communicate with one another. Attempts have been made to bridge these two: game consoles communicate over the Internet so allowing many players to engage in the same game, Apple TV downloads videos from iTunes, Microsoft media extenders play media housed on a user's personal computer. The dominant paradigm is to extend the home entertainment device so that users can search the Internet or nearby computers from the device. Less has been done to extend the PC to push content to the entertainment device.

Set-top boxes exist that stream videos from websites to the TV. The set-top boxes all assume the user sits in front of the TV when navigating between videos. Due to the limitations of TV remote controls, no acceptable user interface has been devised to enable users to hunt through catalogs of thousands of titles. Computers have the advantage of a keyboard and mouse: rich input devices that have performed well for inputting queries to web search engines and video web sites. An entertainment system might exploit the advantages of the computer to push the most relevant content to the TV leaving the home entertainment user interface to handle the smaller problem of hunting through tens or hundreds of titles.

In the case of a joint venture between Amazon and TiVo, a user of Amazon Unboxed can click on a purchased video and it is then downloaded to the user's TiVo Internet-equipped digital video recorder. The TiVo then plays the video directly to the user's TV. NetFlix has a similar arrangement with Roku. However, both products require user configuration and a pre-existing user registration, e.g., for Amazon/TiVo the user must have an account that is linked to the user's TiVo account which is associated with the user's TiVo. The Amazon-TiVo relationship is explicit and does not extend beyond Amazon to other websites. The "click to send" to your TiVo functionality is an example of extending the computer to push content to a device over a network.

SUMMARY OF THE INVENTION

Particular embodiments provide a building block enabling any website to send video to an entertainment device within the user's home without requiring user configuration or account registration, and without exposing the user's device unduly to spam, i.e., unsolicited content pushed from websites or other users.

Particular embodiments enable the following scenario: Alice uses her laptop to browse a website foo.com that serves video. The website contains an Adobe Flash-based video player. Alice watches a video v for a few seconds and decides it is interesting and would like to view the video on her television. Below the video is a button that says, "Send to your living room TV." Alice clicks the button, and a dialog box appears, "foo.bar is attempting to send V to your living room TV. Do you want to allow foo.bar to send videos to your TV?" She clicks "yes," and video V starts playing on her living room TV.

The next day Alice goes to work. While browsing the web she stumbles on a video on bar.com that she would like to watch when she gets home. Even though bar.com and foo.com are not the same website, she sees the name of her television in a button on the website. She clicks on the button, the same message "bar.com is attempting . . . " appears to which she again clicks "yes." When she gets home that night, the program is available on her television.

The discovery of the TV did not require Alice to install anything on her laptop; it did not require her to provide any configuration on her laptop; it did not require her to have any account with foo.com, bar.com or any third party; and it did not require her to configure her television other than to provide it with a human-friendly name when she first purchased the TV. If the TV is manufactured with a reasonable human-friendly name (e.g., Company X 36" TV) then even this step can be skipped. This allows minimal configuration or a truly zero-configuration solution. All of this is achieved within the security constraints imposed by the web browser, and in a manner that resists spam, i.e., particular embodiments resist web sites and other users sending unsolicited content to Alice's TV.

Alice's forays are compelling example uses of particular embodiments. More generally the television could be any device: a stereo, game console, another computer. The communication between the website and the device need not be a message telling the device to play a video but could be any communiqué. Adobe Flash could be replaced with Microsoft Silverlight or any runtime environment imposing a security sandbox. Lastly the dialog prompting the user for permission to send the message could be replaced with any user interface component that requests a policy decision from the user regarding the communication to take place. Or default or previously established policy might forgo the policy prompt.

Particular embodiments specify how devices are discovered and how messages are conveyed to these devices without revealing any unique identifiers for the devices to web sites. Particular embodiments also specify how policy can be implemented with little or no local persistent storage on the user's personal computer, without requiring the user to make policy decisions repeatedly for the same website when there is non-zero persistent storage, and without permitting the website to modify or subvert the policy.

A further understanding of the nature and the advantages of particular embodiments disclosed herein may be realized by reference of the remaining portions of the specification and the attached drawings.

Figure 1:
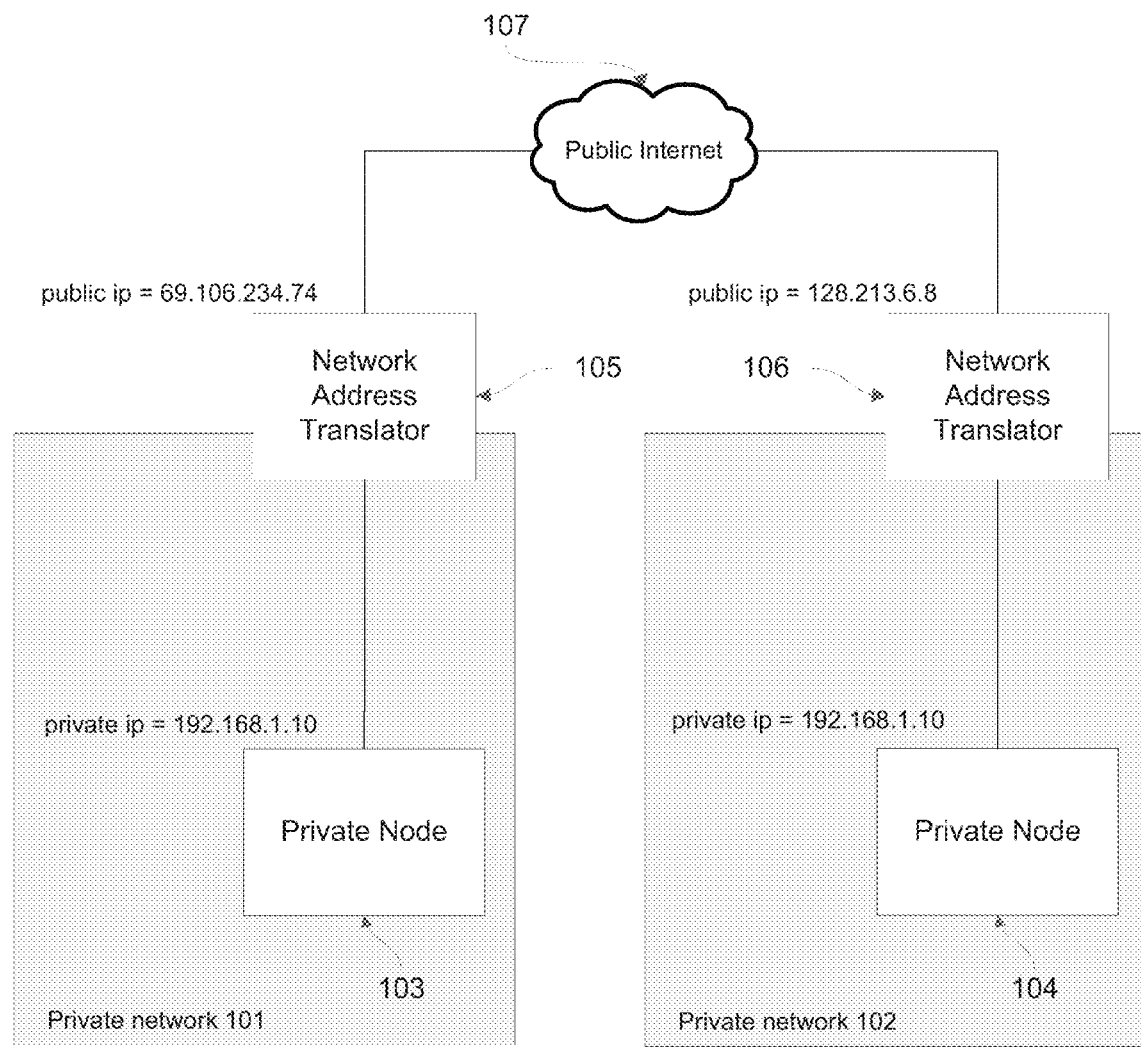
FIG. 1 illustrates the terminology "private networks" and "public networks" used in describing the present invention.

In all figures, this document adopts notation with syntax identical to that of the programming language Python. Brackets [ ] surround a list; curly brackets { } surround a dictionary; and commas separate elements in a dictionary, elements in a list, or arguments in a call. Lists appearing in figures sometimes contain a single element, but this should be taken to mean that there can be zero or more elements in the list. In some cases the semantics of a zero element list may be ill-defined. For example, there is no reason and no possibility for a device with zero network interfaces to announce itself to the network. Dictionaries contain key-value pairs. Keys are unique, but values need not be so. The key and value are separated by a colon. In a call, particular embodiments present variable name and value separated by the assignment operator '='. Values are represented using italics. Values are provided for purposes of illustration with the understanding that they should be replaced for each real-world scenario, e.g., replace "name" with the actual name of some entity.

DETAILED DESCRIPTION OF PREFERRED EMBODIMENTS

When the Internet was first designed in the late 60's and early 70's all nodes were provided with static IP address assignments and all packets were routed only based on IP address. IP addresses were hard to remember so nodes were assigned names, but not until the Domain Name System (DNS) was there a single scalable distributed database for translating domain names to IP addresses.

The DNS uses domain names not only to name nodes but also to specify administrative boundaries and has been overloaded to locate nodes serving a particular function and to locate services running on particular ports. For example www.example.com refers to the nodes providing World Wide Web services in the administrative domain example.com. If a user working at the example company wishes to find a printer he or she might look up ipp.example.com where ipp stands for "Internet Printing Protocol." However, to do so would require the user to know he or she is on a network under the same administration as example.com. When a computer boots for the first time, it has no IP address and it does not know its administrator's domain. If a computer moves its IP address might change and the administrator of the network in which the computer finds itself might have changed. The printer ipp.example.com may no longer be the appropriate printer or may no longer be accessible.

To allow users to boot or move their computers into networks without requiring any a priori knowledge or user configuration, most computers implement some form of Zero Configuration networking (Zeroconf). All modern Apple computers implement a form of Zeroconf called Multicast DNS (MDNS) and DNS-based Service Discovery (DNS-SD) as parts of Bonjour. Multicast DNS is similar to the Internet's Domain Name System (DNS) except every node in the network acts as a server. When a computer multicasts a query for the IP address of the node with domain name "foo," if "foo" is on the network then "foo" responds with its IP address. As with DNS, the query need not be for a node's IP address, but may be a query for a named service. PoinTeR (PTR) resource records point from one domain name to another. With DNS-SD, the user looking for service "bar" queries for a PTR record for domain name bar.example.com, where "bar" and "example.com" can be replaced with any service and domain name respectively. The PTR record maps to a domain name of the form <instance>.<service>.<domain> where <instance> is replaced with a human-friendly name and <domain> can be any domain name, but for discovering services on the local network, the domain name is "local." For example, to discover the printers on the local network, a client queries for the PTR record for ipp.tcp.local. Assume there are two printers in the network named "1st floor" and "mezzanine" These two printers return PTR resource records to the respective domain names:

1st floor._ipp._tcp.local mezzanine._ipp._tcp.local

Assume the client wants to print to the printer named "1st floor," the querying client then sends a second query for the service (SRV) record for "1st floor." The SRV record contains the port number and canonical domain name for the printer. Now that the client has uniquely identified the printer and the port number on which the printer's print service application is running, the client sends the job to the printer.

Apple's MDNS and DNS-SD work when the application has access to multicast. However, the security sandbox does not allow access to multicast: Adobe Flash employs such a sandbox and thus a flash-based application running in the browser cannot directly discover a printer, TV, or other local networked peripheral. When a user wishes to print a web page, the browser rather than a sandboxed program initiates the print process. The browser has access to multicast or indirectly has access to MDNS via the Bonjour system service provided by OS X or as an installed service on nodes running Unix or Microsoft Windows.

Microsoft's competing discovery mechanism Simple Service Discovery Protocol (SSDP) relies on UDP unicast and multicast. Neither UDP unicast nor multicast is available within the security sandbox.

Similarly the IETF's Service Location Protocol (SLP)(4), UPnP (which is based on SSDP), and uTorrent's Local Service Discovery (LSD) use multicast to discover services within the local area network and thus share the same problem with MDNS/DNS-SD and SSDP.

A node on the Internet is a computer or device that has an Internet Protocol (IP) address. Nodes include but are not limited to laptops, printers, desktop computers, and IP-equipped televisions, stereos, and game consoles. When a node communicates with another node it sends a packet that like an envelope in the postal mail system contains a message and bears a source and destination address. Messages, especially lengthier messages, may span multiple packets. With a packet, the addresses are IP addresses. The IP address is a numeric address not generally intended for human consumption, but rather is used by nodes inside the Internet to forward packets toward the destination node. Many nodes on the Internet also have a human-friendly domain name that uniquely names the node. A domain name may also refer to a set of nodes. For example www.google.com refers to the set of computers that provide the human-facing portion of google's web search service.

A server refers to a node or set of nodes that respond to queries from clients. A node may be both a server and a client depending on the role the node takes in processing a particular query/response. Google's nodes running at www.google.com are servers and the nodes that query google.com with web searches are clients.

Particular embodiments refer to devices or discovering services offered by a device. For illustration, this is appropriate since embodiments are applicable to discovering services offered by televisions, digital video recorders, printers, or other special-purpose electronics that consumers usually refer to as "devices." For example, the service provided by a printer is to print a document while the service offered by a networked TV may be to play a video. More generally this document describes mechanisms to discover services within a network. Any service which can be discovered using embodiments of the discovery service is a discoverable service.

The Internet may be divided into public and private networks (as illustrated in FIG. 1). All nodes in the public network have IP addresses that any other node in the public Internet can use as a destination IP address, and the public Internet will try its best to forward any packet so addressed to the appropriate destination node. Each node on a private network has an IP address that is only guaranteed unique within its private network. This document refers to each node in a private network as a private node. FIG. 1 illustrates a collision between IP address assignments meaning two private nodes 103, 104 in different private networks 101, 102 have the same IP address. Private IP addresses can be used to route packets within their respective private networks 101, 102, but due to the ambiguity resulting from collisions in address assignments, private IP addresses cannot be used to route packets on the public Internet 107. Home users and corporations often have their own private networks on which multiple nodes can communicate with each other using their private IP addresses.

To communicate with nodes over the public Internet, private nodes communicate via a Network Address Translator (NAT) 105, 106. A NAT straddles private and public networks and has both a public IP address and a private IP address. The NAT replaces the source address on each packet destined for the public Internet with the NAT's public IP address. A response to the packet is addressed for the NAT. The NAT translates the destination address from packets arriving from the public Internet to the appropriate private IP address within its private network. In FIG. 1, all given IP addresses are examples that serve for the following illustration: a packet from private node 103 destined for private node 104 would start with source address 192.168.1.10 and destination address 128.213.6.8. Private node 103 may not even be aware of private node 104's private IP address. When the packet leaves private network 101, the NAT 105 translates the source address from 192.186.1.10 to 69.106.234.74. As the packet transits the public Internet 107, the packet has source address 69.106.234.74 and destination address 128.213.6.8. When the packet arrives at NAT 106, the NAT replaces the destination address with the appropriate private IP address 192.168.1.10 and then forwards the packet to private node 104.

To address a packet to a specific application running on a node, packets also contain source and destination port numbers. Any given application may send from or listen on any number of ports, but a port belongs to only one application at any given time. As a shorthand this document often refers to a sender's or receiver's IP address x and port number y as the address pair (x,y). The pair is denoted as a sender's or receiver's address. When the IP address in an address pair is a private IP address, this is denoted the private address. When a packet passes through a NAT from a private network to a public network, the sender's private address is mapped to a port on the NAT's public-facing network interface. The port number on a NAT mapped to a private address and the NAT's public IP address together constitute a sender's or receiver's public address. Many NATs attempt to preserve port numbers when mapping from private to public IP addresses, but this is not always possible. Assume two packets destined for www-.google.com port 80 arrive from the private network: packet 1 has sender private-IP and port (x,y), packet 2 has sender private-IP and port (w,y). Both packets have the same sender port. A NAT often has only 1 public IP address here denoted n. If the NAT maps packet 1 to (n,y) and maps packet 2 to (n, y) then both packets appear to come from the same private node. Instead the NAT maps either packet 1 or packet 2 onto a sender port other than y so that when responses arrive from google, the NAT can forward those responses back to the correct private nodes. The ambiguities and limitations imposed by NATs may influence the design of certain embodiments.

When a user visits a web site, the web browser downloads a number of web pages often containing one or more scripts written in Javascript or Actionscript. Such scripts or anything that executes in a web page are usually constrained in the types of operations they can perform. These constraints protect the user's privacy and the security of the user's computer. These constraints together comprise a security sandbox or more tersely a sandbox. Hereafter anything that executes in a security sandbox is referred to as a sandboxed program. The sandboxed program may be a script, binary executable, intermediate bytecode, abstract syntax tree, or anything that can be executed with the appropriate runtime environment. A security sandbox may or may not run inside a web browser.

Particular embodiments assume a user runs a sandboxed program. This program wishes to communicate with services running on devices that reside in the same private network. The program calls a discovery agent that finds discoverable services within the same private network and updates contact information (addresses) for services that were previously contacted but may now reside in another private network. The discovery agent tells the sandboxed program about the discovered services. Subsequent sections describe the discovery process, and several variations that permit direct communication when the sandboxed program and discoverable service reside in different private networks.

Security Sandbox

Particular embodiments operate within a security sandbox that imposes the following restrictions:

Sandboxed programs may have no storage that persists between executions of the sandboxed program.

Sandboxed programs may have no access to the network other than to open unicast connections to the origin server and no access to any other server unless the server explicitly permits the communication. The communications may be further constrained to using TCP and/or UDP, or even further to HTTP or a subset of application-layer unicast protocols.

Sandboxed programs may not have access to any local resources (file system, devices, etc.) other than memory, computation, and space to render a user interface on the user's screen.

Sandboxed programs may not be permitted to communicate with other programs running on the local system.

Sandboxed programs may not be permitted to communicate with other programs running within other security sandboxes except via a limited, mutually agreed programming interface enforced by the sandboxes.

Particular embodiments may also work in security sandboxes that impose a subset of these restrictions or weaker versions of these restrictions.

Particular embodiments may not require substantial computation or memory and reasonable constraints on computation or memory usage will not affect the proposed embodiments.

In the case of Adobe Flash, the explicit permission to communicate with a server comes in the form of a crossdomain.xml file that specifies permissions to access a domain x and is stored at URL http://x/crossdomain.xml. After the crossdomain.xml file has been communicated, further communication with existing Adobe Flash 8 through 10 libraries occurs over HTTP. With Adobe Flash 8 through 10, sandboxed programs can communicate with each other via LocalConnection objects or via Javascript calls exported via the ActionScript ExternalInterface. LocalConnection and ExternalInterface mechanisms are provided as examples, other mechanisms may exist for sandboxed programs to communicate with each other, and other mechanisms may be introduced in future versions of Adobe Flash.

A service that is designed to communicate with sandboxed programs is called a sandbox-reachable service. A service designed to communicate with a program running in an Adobe Flash sandbox is called a flash-reachable service. Specifically, a flash-reachable service speaks HTTP and returns a sufficiently permissive crossdomain.xml file.

Centralized Embodiment

Traditionally a program multicasts or broadcasts to its local network to discover available networked services. Because sandboxed programs cannot use multicast or broadcast, they discover services via some intermediary. This intermediary is referred to as the discovery service. Services announce themselves to the discovery service, and discovery agents running with the sandboxed program query the discovery service to discover previously announced devices.

Figure 2:
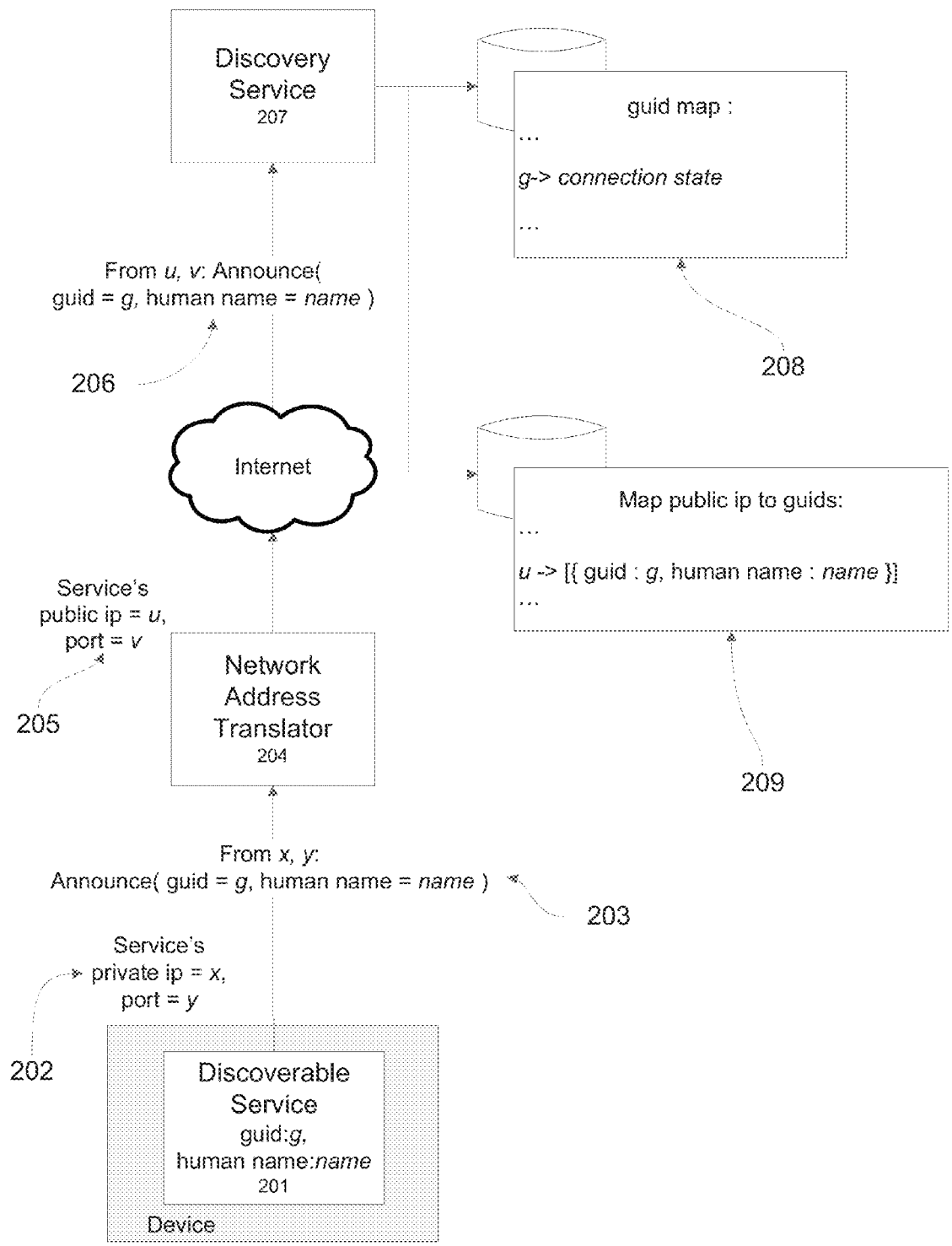
FIG. 2 illustrates a discoverable service using the centralized embodiment announcing its existence to the discovery service.

In the centralized embodiment of this invention, as shown in FIG. 2, a device 201 announces its existence to the discovery service 207.

Each discoverable service running on device 201 has a globally unique id (GUID) denoted g. The GUID is provided only to the discovery service 207 and to nodes on the same private network. The GUID is valuable in that it identifies the device even when the device's public or private addresses change, e.g., the user's service provider may reallocate the customer's public IP address(es), the device owner may change Internet service providers, or the private network's Dynamic Host Configuration Protocol (DHCP) may reassign IP addresses. In practice the GUID can be assigned during manufacture, or the GUID can be a random number drawn from a large enough space that the resulting number is unique with high probability. The latter allows the GUID to be changed at any time without contacting a central authority. An owner might wish to change a device's GUID if he or she believes the GUID has been compromised, e.g., as might be evidenced by a sudden increase in spam appearing on her TV.

The discoverable service on device 201 also has a human-friendly name denoted by the key "human name" with value "name." The human name is not intended to be globally unique and possibly not even locally unique, but rather to be meaningful to the users of a service. Example names include "living room TV" and "bedroom printer." Device 201 also has at least one IP address 202 in order for it to communicate to the network. Device 201 may have more than one IP address. If the device 201 sits inside a private network that is connected to the public Internet via a NAT 204 then all of the device's IP addresses are private IP addresses. Any communication sent or received by this device must originate or be destined to a program with a port number. Thus device 201 has a both a private IP and port pair 202, hereafter called the address pair and illustrated as (x,y) in FIG. 2. Quite often the port number(s) assigned to a service are the same across the node's IP addresses, but this is not a requirement imposed by the Internet Protocol and thus the address and port are oft considered an indivisible pair when announcing, discovering, or communicating with a device.

When announcing, device 201 sends its service information: its GUID, and its human name 203. As the announce message propagates from the private network via the NAT 204 to the public Internet, the NAT 204 translates the device's announce message's private address (x,z) to its public address (u,w) 205 where u is the public IP address of the NAT 204. (x,z) differs from (x,y) because the connection over which the device announces may use an ephemeral source port, i.e., a port allocated for use by a single connection. Ephemeral ports are described in any textbook on TCP/IP. The end result of this translation is the message 206, which the Discovery Service 207 receives. The Discovery Service stores the service information for later lookup 208 during the discovery process.

In the centralized embodiment, the connection used for announcing is also used for forwarding all communications between sandboxed programs and the discoverable services. Thus the table 208 also contains connection state such as a socket file descriptor. Since a connection is initiated by the discoverable service to the discovery service, it is likely that such connections will be permitted by any NAT, especially if those connections use HTTP. Since the connection between the discoverable service and the discovery service is maintained, it can probably be used to route messages back through any number of intervening NATs so long as those NATs permit long-run HTTP connections to the discovery service. To prevent NAT mappings from timing out, the discoverable service, sends periodic keep-alive messages.

If only infrequent and small communications take place between sandboxed programs and any given discoverable service then the centralized embodiment is the best solution due to its simplicity.

When a user runs a sandboxed program that queries the discover service, the discovery service returns the GUID and any human names for the services behind the same NAT. The GUID ensures that the sandboxed program can distinguish between devices that have identical human names.

Figure 3:
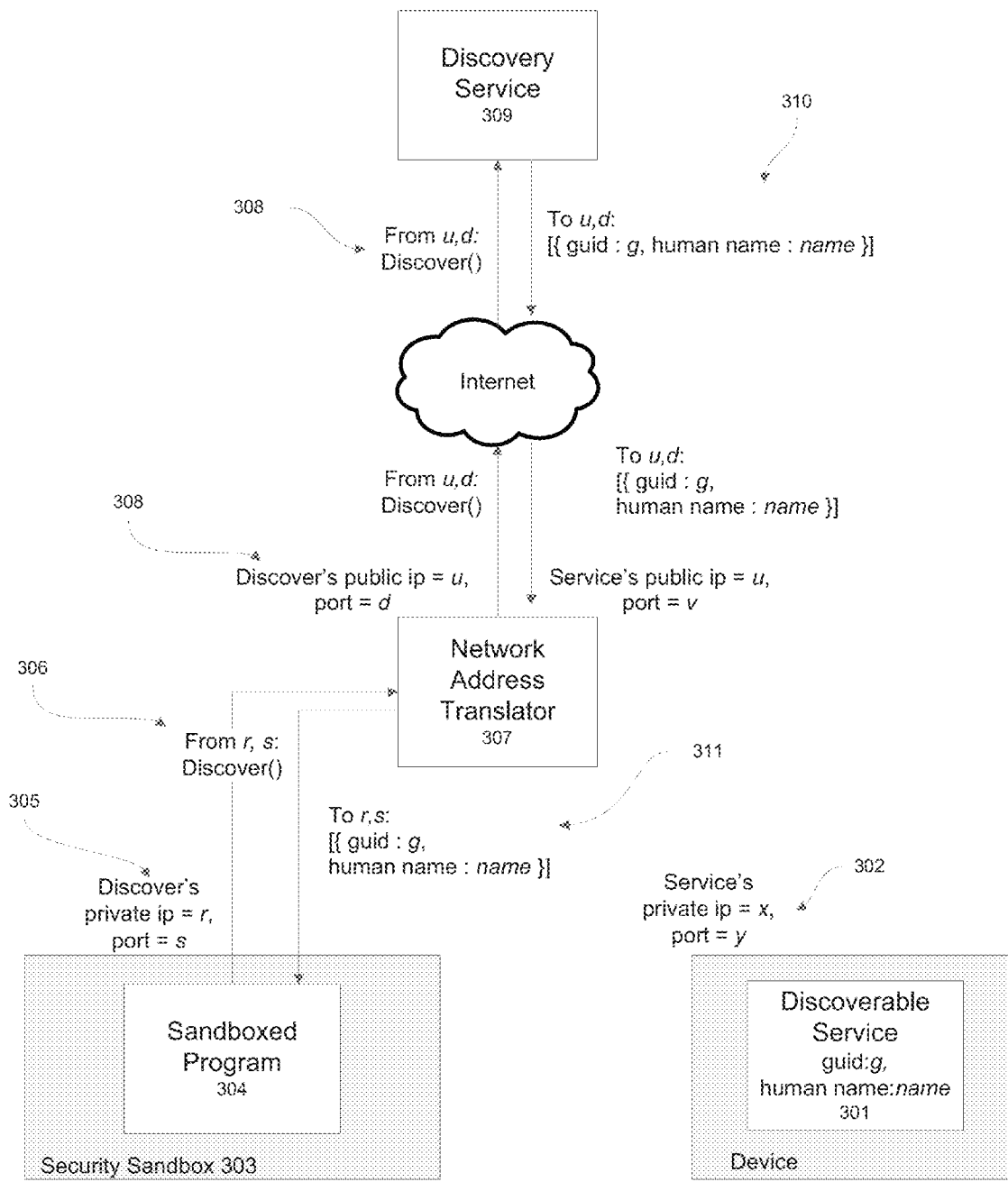
FIG. 3 illustrates a sandboxed program using the centralized embodiment discovering and communicating with the discoverable service.
Figure 4:
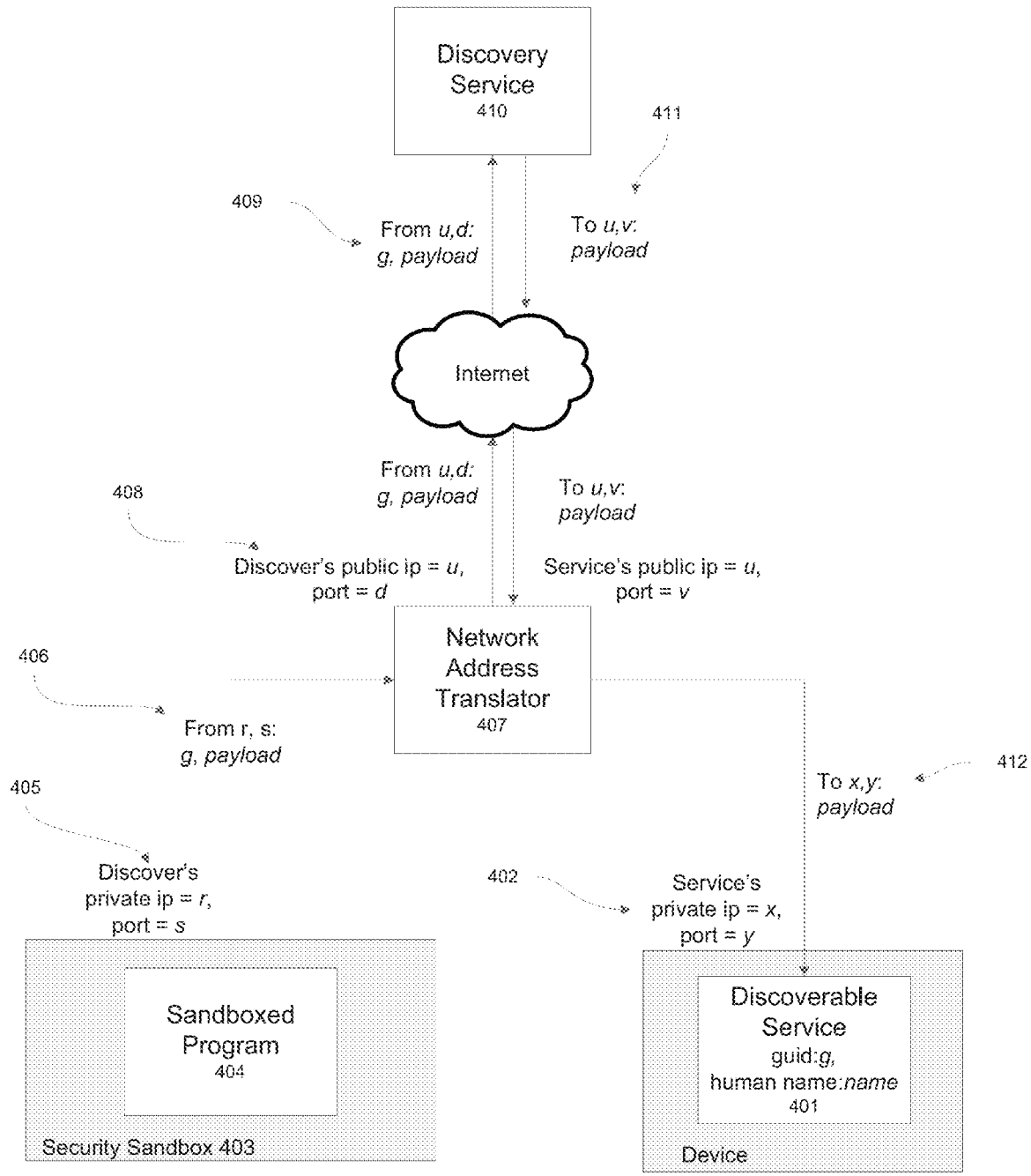
FIG. 4 illustrates sandboxed program using the centralized embodiment to forward communications via central infrastructure called the discovery service to a discoverable service when both the sandboxed program and the discoverable service reside on the same private network.

FIG. 3 illustrates the discovery process. A sandboxed program 304 running in security sandbox 303 sends a discovery message 306 to the discovery service 309. The discovery message 306 is addressed from the sandboxed program's 304 private address r,s 305. When the discovery message transits the Network Address Translator 307, the private address is translated to the sandboxed program's public address u,d 308 creating an otherwise identical discovery message but addressed from u,d. As with z in FIG. 2, d is most likely an ephemeral port allocated by the operating system on which the sandboxed program runs for use by this discovery message's connection. The discovery service 309 performs a lookup based on the message's public IP address u. If one or more devices are found that have the same public IP address u as the sandboxed program then the device(s) are assumed to reside in the same private network with the sandboxed program. This illustration follows from the illustration in FIG. 2 where there is a device 201, 301 with the same public IP address u. Thus the discovery service responds with the service information 310 for device 301.

Once the sandboxed program 304 has obtained device 301's service information, the sandboxed program has the necessary information to contact 301. When the sandboxed program 304 404 decides to communicate with the discoverable service 301 401, it forwards the desired payload to communicate with the destination service's guid 406 409 through the NAT 407 to the discovery service 410. The discovery service looks up the connection state such as a file descriptor from the table shown in 208 and forwards the payload through this connection 411 412 to the discoverable service 401.

Figure 5:
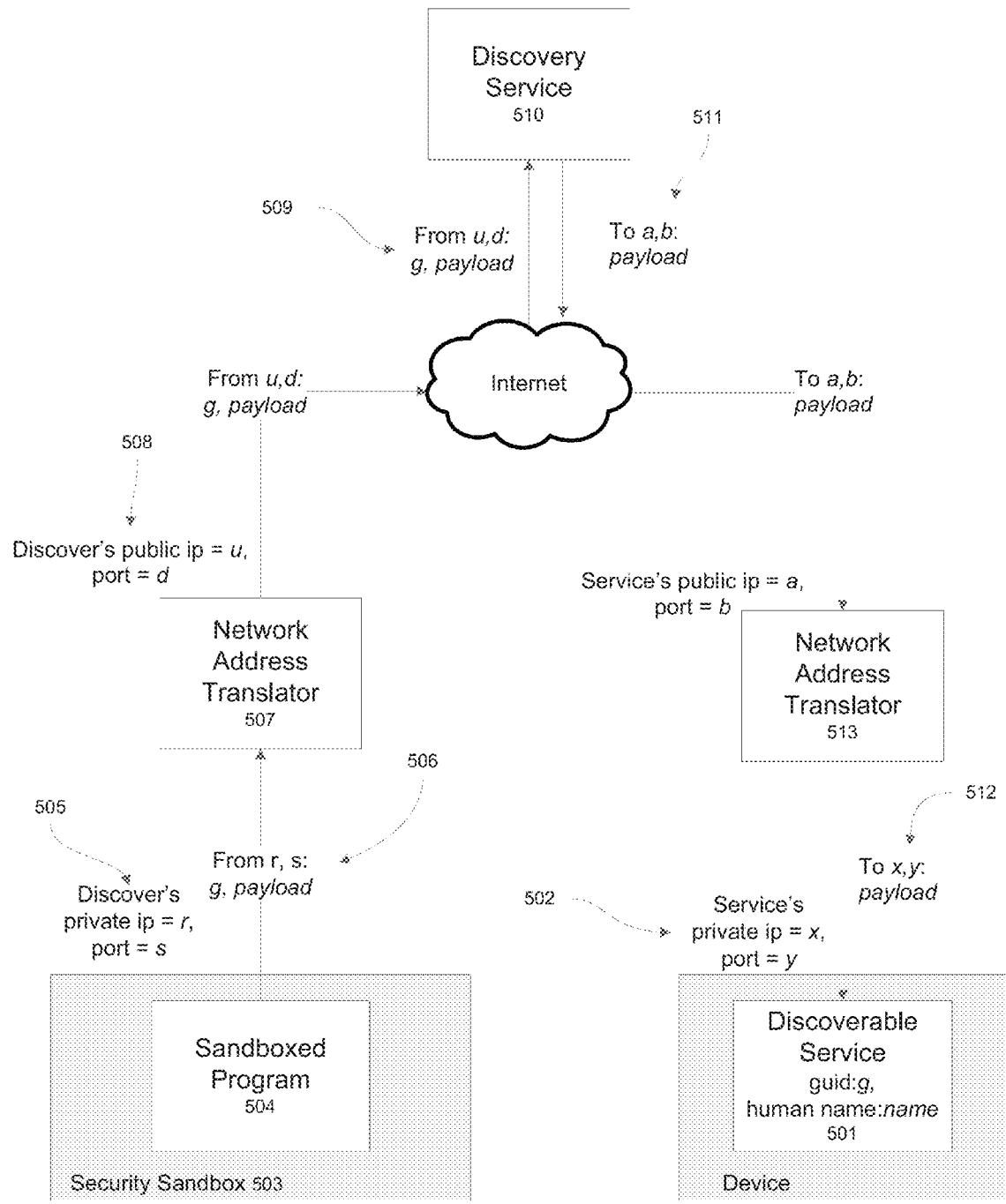
FIG. 5 illustrates how a sandboxed program implementing the centralized embodiment forwards communications to a discoverable service when the discoverable service and the sandbox reside on separate private networks.

By virtue of passing all communications through central infrastructure and having devices maintain connections to the central infrastructure, the centralized embodiment can penetrate commercially available NATs. FIG. 5 illustrates the centralized embodiment enabling communication between the sandboxed program 504 and the discoverable service 501 when they reside behind different NATs 507 and 513 respectively.

Figure 6:
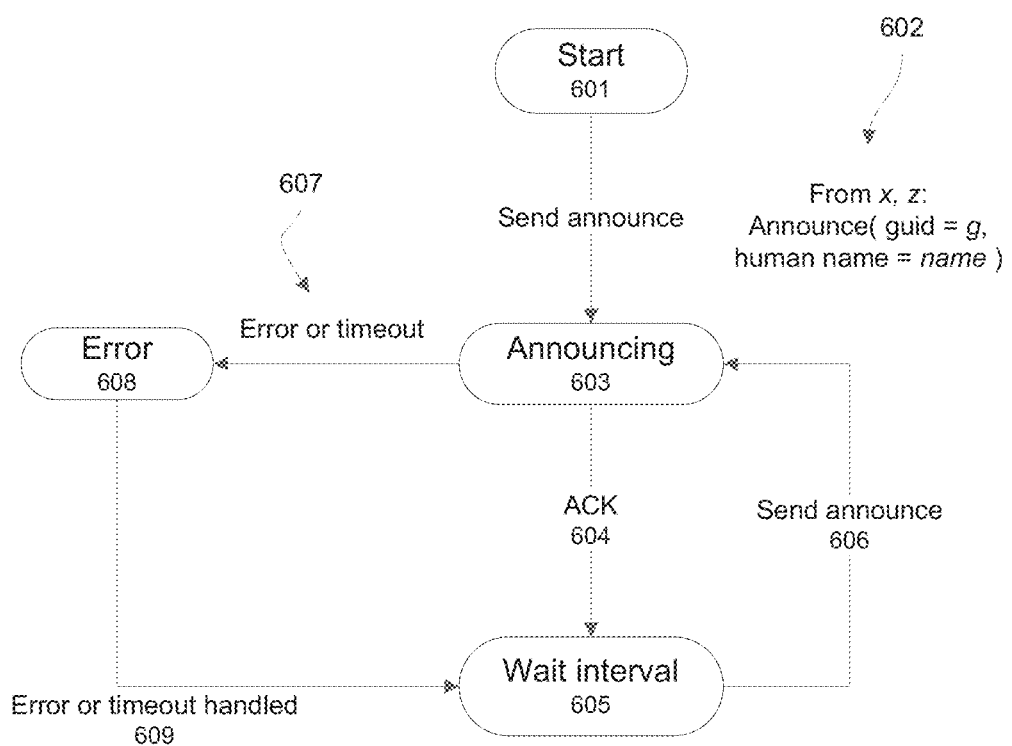
FIG. 6 presents a minimalist state machine for the announce functionality of a discoverable service implementing the centralized embodiment.
Figure 7:
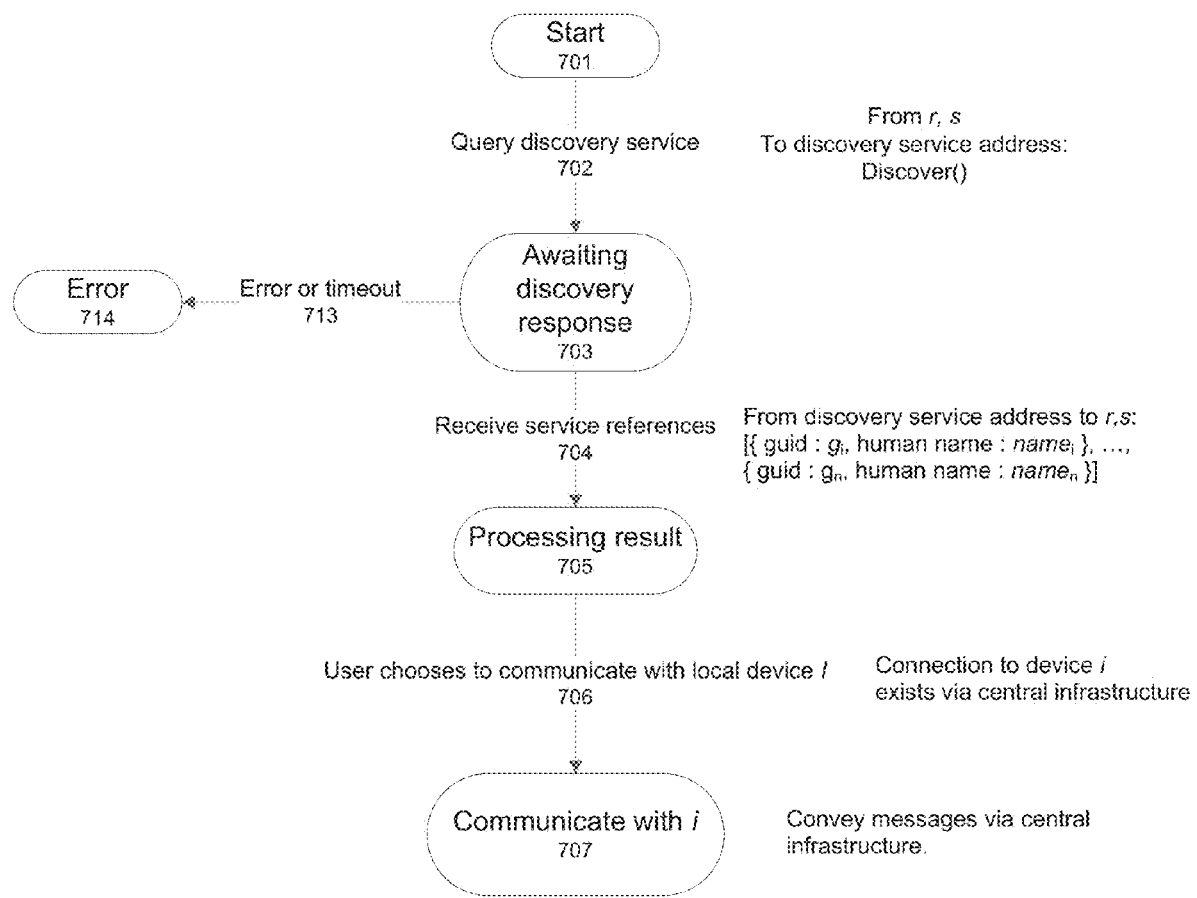
FIG. 7 presents a minimalist state machine for a sandboxed program implementing the centralized embodiment to discover discoverable services.
Figure 8:
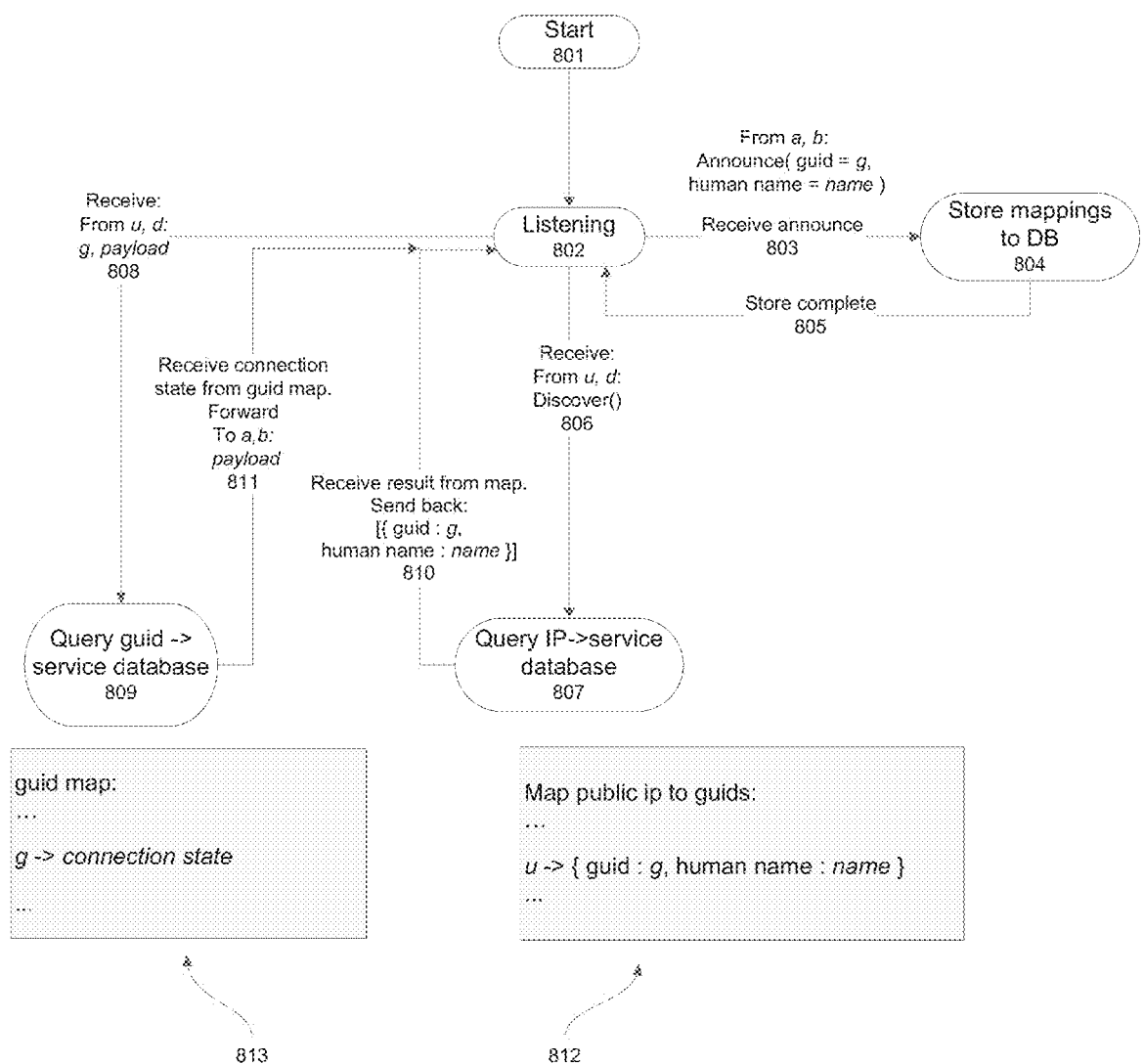
FIG. 8 presents a minimalist state machine for a discovery service implementing the centralized embodiment to store state for announcements from discoverable services and to answer discovery requests from sandboxed programs.

FIGS. 6 through 8 show state-transition diagrams for the centralized embodiment.

If there is no user configuration and devices and the sandboxed program come from disparate organizations, e.g., the device manufacturer and a website respectively, then the discovery service may be known to both a priori. In practice, this means the discovery service is global.

Variations on the Centralized Embodiment

In another embodiment, the announce message omits the human name. The human name would then not appear in the mappings maintained by the discovery service, and would not be communicated from the discovery service to the sandboxed program. The guid is all that is necessary to route packets through central infrastructure to the sandboxed program and device reside on the same private network. The human name could thus be obtained from further communication between the sandboxed program and the discovered service. The no-human-name embodiment has the drawback that the human name cannot be presented to the user until after at least the first call between the sandboxed program and the device has completed. Thus there would be no human name to present a meaningful error message when the sandboxed program cannot communicate with the discovered service. This may not be deemed a drawback if the sandboxed program calls the services to confirm they are reachable before their human names in the user interface.

For the centralized embodiment, the term "discovery service" is a bit of a misnomer. Central infrastructure provides both discovery and application-layer routing between the sandboxed programs and the discoverable services. The discovery service is logically centralized, but may be distributed across multiple servers to provide scale and robustness. The IP address space and the guid address space may be partitioned across these servers and/or replicated across subsets of the servers to provide failover.

For reasonable performance the service information for the two queries based on GUID or based on IP address may be stored in separate mappings (a.k.a., indices): from GUID to service information 208 and from public IP to service information 209. The traditional data structure for such lookups is a hash table though the mappings can be stored with different trade-offs in time and space complexity using a variety of data structures (e.g., tries, balanced trees, radix trees).

With some cost in lookup time, a Distributed Hash Table (DHT) permits a physically decentralized lookup data structure and associated message routing where the data structure can be spread across a wide number of nodes including the devices themselves. However DHTs introduce occasional NAT traversal problems, since many of the nodes in the DHT may be behind NATs. Furthermore, the nodes in a decentralized data structure are less trustworthy and thus using a DHT introduces potential spam problems.

Embodiment that Allows Direct Communication

With the centralized embodiment, all communications between sandboxed programs and discoverable services pass through the discovery service. The centralized embodiment requires an amount of infrastructure linear to the volume of communications between sandboxed programs and discovered services. Communicating without passing packets through central infrastructure is denoted as direct communications. By this definition, directly communicated packets may transit between two nodes on a Local Area Network (LAN) or may pass through multiple routers and NATs between two nodes on disparate networks. This section presents an embodiment wherein central infrastructure is still used to discover services, but once a service has been discovered all further communications takes place directly between the sandboxed program and the discoverable service. The embodiment that enables direct communications is hereafter called the direct embodiment.

With the direct embodiment, the central infrastructure requirement scales linearly with the number of announces and discovery requests it must process as opposed to linearly with all communications transiting between sandboxed programs and discovered services.

TVs, DVRs, and set-top boxes are usually not considered mobile devices. Non-mobile nodes may retain IP address assignments for days or longer even when repeatedly turned off. Discoverable services running on those nodes can choose to reuse the same port numbers whenever possible, thus making ip and port stable values worthy of caching. If the sandboxed program caches ip-port pairs as long as the ip-port pairs remain valid, the sandboxed program may communicate with the device hundreds of times for each time the sandboxed program must contact the discovery service.

To achieve direct communications between the sandboxed program and the discoverable service, the system communicates more information via the discovery service: the sandboxed program must at least know the private address of the discoverable service. For remote access the sandboxed program also needs the discoverable service's public address. Once a sandboxed program knows the discoverable service's addresses, it can attempt to establish communications. If the sandboxed program resides on the same private network with the discoverable service then opening a connection to the private address likely succeeds. Establishing direct communication between private networks and thus through one or more NATs is more complicated.

Figure 9:
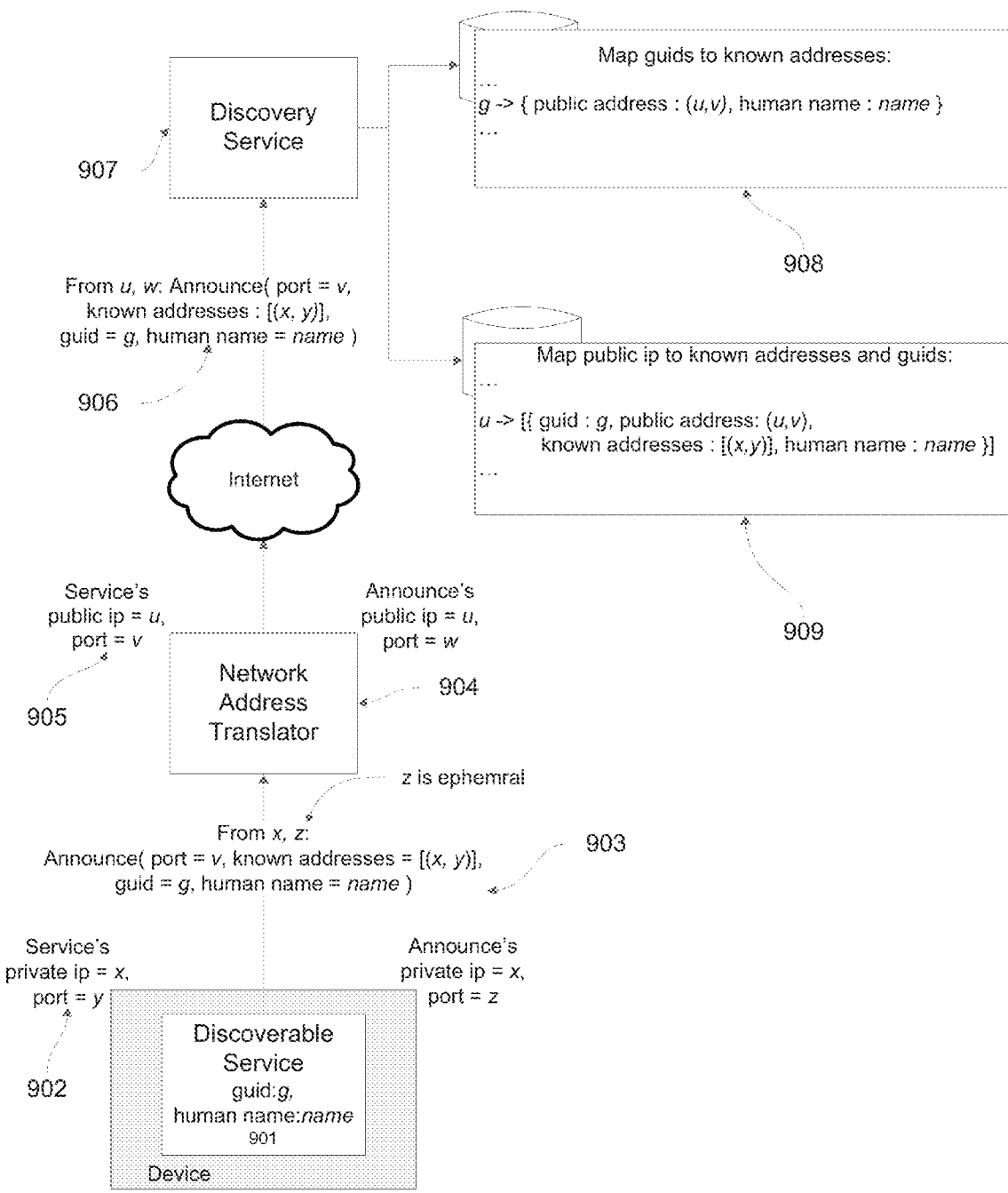
FIG. 9 illustrates a discoverable service using the direct embodiment announcing its existence to the discovery service.

When announcing, discoverable service 901 sends its service information: a list of all of its known addresses, the service's port v mapped on the NAT, its GUID, and its human name 903. In the centralized embodiment, the known addresses are the IP addresses of the discoverable service's device's network interfaces with their respective ports on which the discoverable service listens. In FIG. 9, the device has private IP address x and listens on port y 902.

As the announce message propagates from the private network via the NAT 904 to the public Internet, the NAT 904 translates the device's announce message's private address (x,z) to its public address (u,w) 905 where u is the public IP address of the NAT 904. (x,z) differs from (x,y) because the connection over which the device announces may use an ephemeral source port, i.e., a port allocated for use by a single connection. Ephemeral ports are described in any textbook on TCP/IP. The end result of this translation is the message 906, which the Discovery Service 907 receives. The Discovery Service stores the service information for later lookup during the discovery process.

Figure 10:
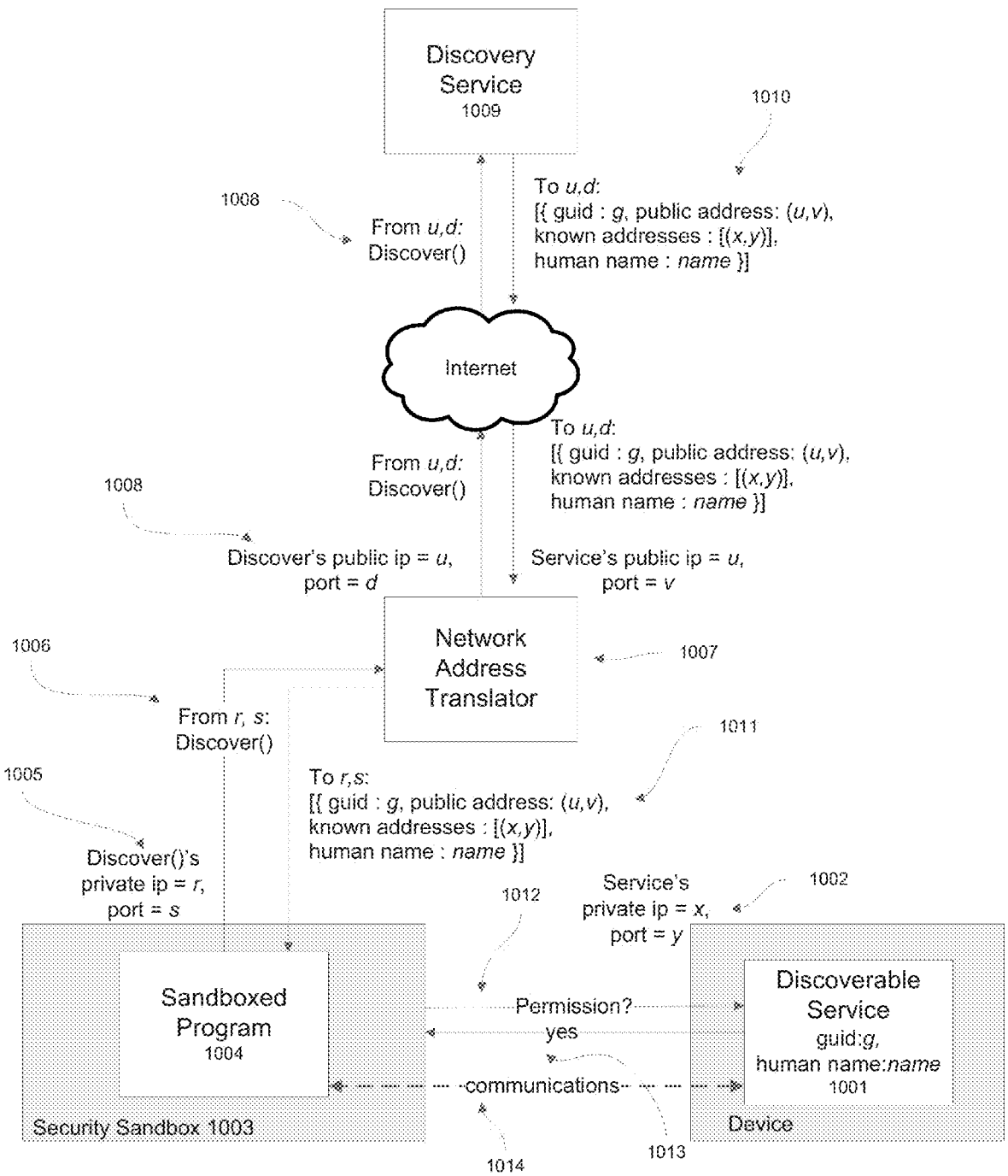
FIG. 10 illustrates a sandboxed program using the direct embodiment discovering and then communicating directly with a discoverable service residing in the same private network.

FIG. 10 illustrates the discovery process. A sandboxed program 1004 running in security sandbox 1003 sends a discovery message 1006 to the discovery service 1009. The discovery message 1006 is addressed from the sandboxed program's 1004 private address r,s 1005. When the discovery message transits the Network Address Translator 1007, the private address is translated to the sandboxed program's public address u,w 1008 creating an otherwise identical discovery message but addressed from u,d. As with z in FIG. 2, d is most likely an ephemeral port allocated by the operating system on which the sandboxed program runs for use by this discovery message's connection. The discovery service 1009 performs a lookup based on the message's public IP address u. If one or more devices are found that have the same public IP address u as the sandboxed program then the device(s) are assumed to reside in the same private network with the sandboxed program. This illustration follows from the illustration in FIG. 2 where there is a device 901, 1001 with the same public IP address u. Thus the discovery service responds with the service information 1010 for discovered service 1001. The service information contains the known private 1002 and public addresses of the discovered service 1001.

Once the sandboxed program 1004 obtains device 1001's service information, the sandboxed program has the necessary information to contact 1001. When the sandboxed program 1004 decides to communicate with device 1001, to satisfy the requirements of the security sandbox, the sandbox queries the discovered service to obtain permission 1012 to communicate. Assuming the discovered service grants permission 1013, the sandboxed program 1004 proceeds to communicate with the discovered service 1014.

FIGS. 11 through 14 provide state-transition diagrams for the direct embodiment.

Figure 11:
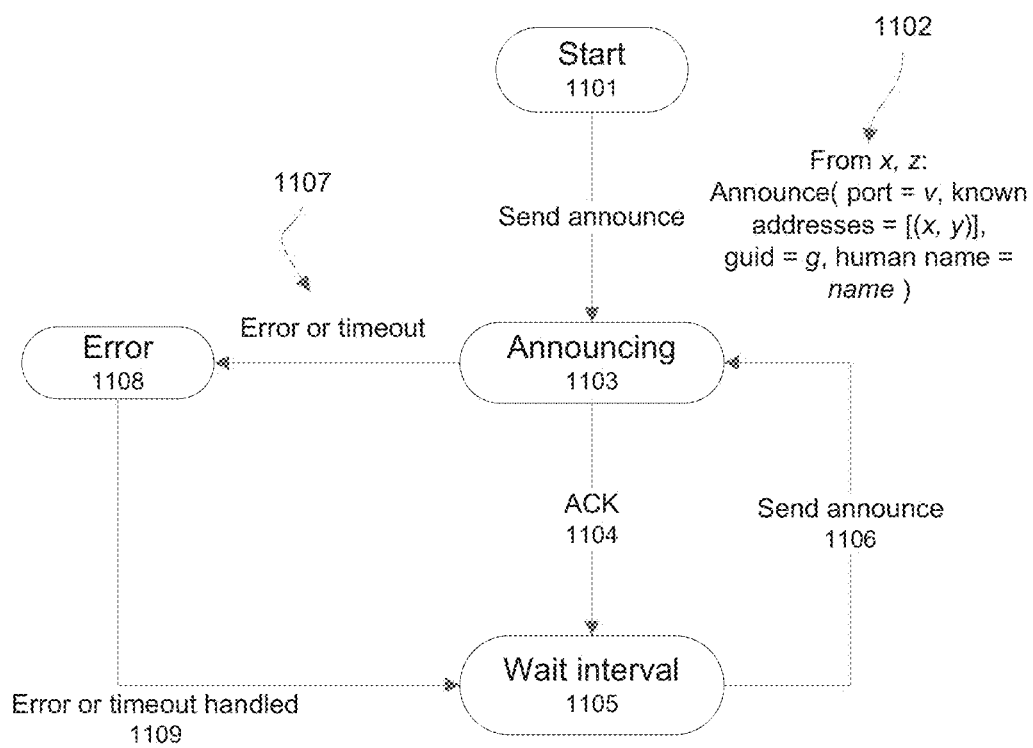
FIG. 11 presents a minimalist state machine for the announce functionality of a discoverable service implementing the direct embodiment.

FIG. 11 shows the state machine for a discoverable service implementing the direct embodiment that periodically announces itself to the discovery service. The discoverable service starts 1101 by announcing 1102 to the discovery service and then periodically 1105 1106 thereafter. If the announcing service cannot establish a connection to the discovery service or the discovery service does not acknowledge the announce message then the announce times out 1107. Timeouts and other errors result in the announcing device delaying before attempting another announce. Variations on this state machine include exponentially backing off after a timeout or load-related error condition to avoid overwhelming the discovery service. The wait interval 1105 can be a system constant or the discovery service can suggest a wait interval just as BitTorrent trackers return an announce interval to BitTorrent clients.

Figure 12:
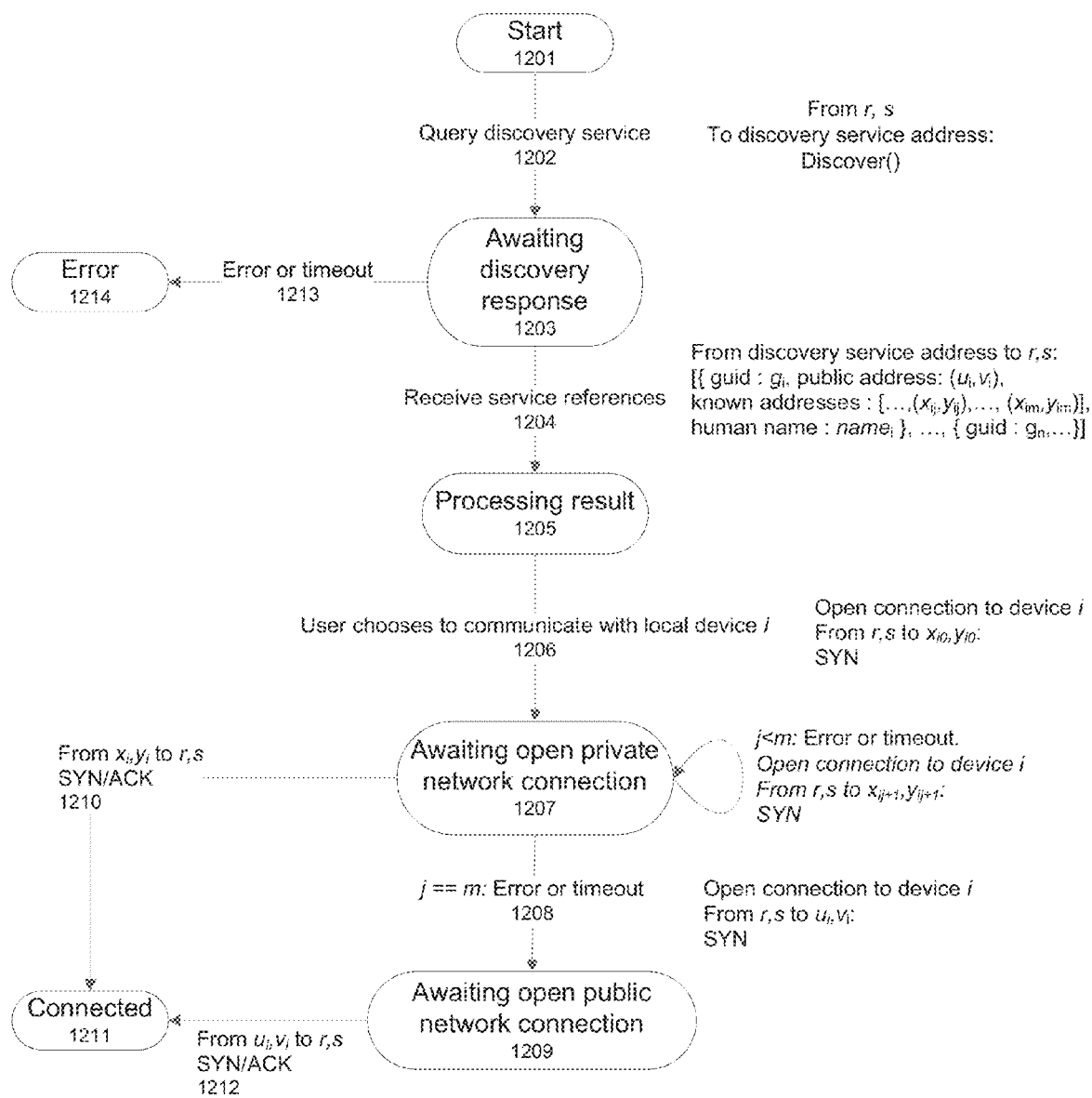
FIG. 12 presents a minimalist state machine for a sandboxed program implementing the direct embodiment to discover discoverable services within its private network.

FIG. 12 shows the state machine for a sandboxed program attempting to discover a service in the local private network then connecting to one selected by the user. Since more than one address may be reported for a given service, the sandboxed program attempts each in succession. Although this state machine shows each attempt to open a connection to the discoverable service occur in series, it is a trivial modification to the centralized embodiment's state machine to permit the connection attempts to proceed in parallel to reduce lookup time at the expense of potentially performing unnecessary queries.

The discovery state machine completes once the connection has been established 1211 because what is communicated over the connection is orthogonal to the discovery process.

Figure 13:
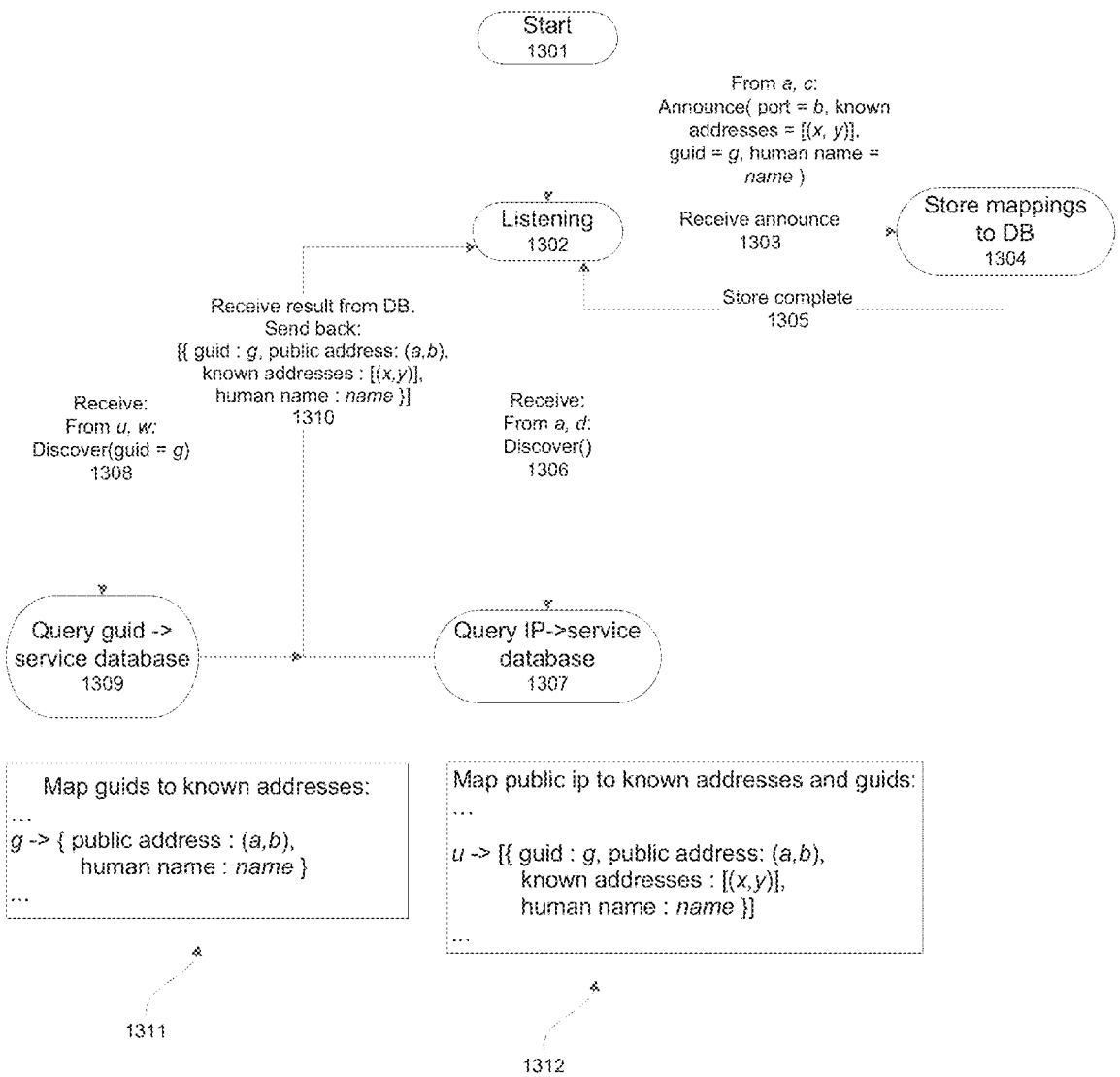
FIG. 13 presents a minimalist state machine for a discovery service implementing the direct embodiment to store state for announcements from discoverable services and to answer discovery requests from sandboxed programs.
Figure 14:
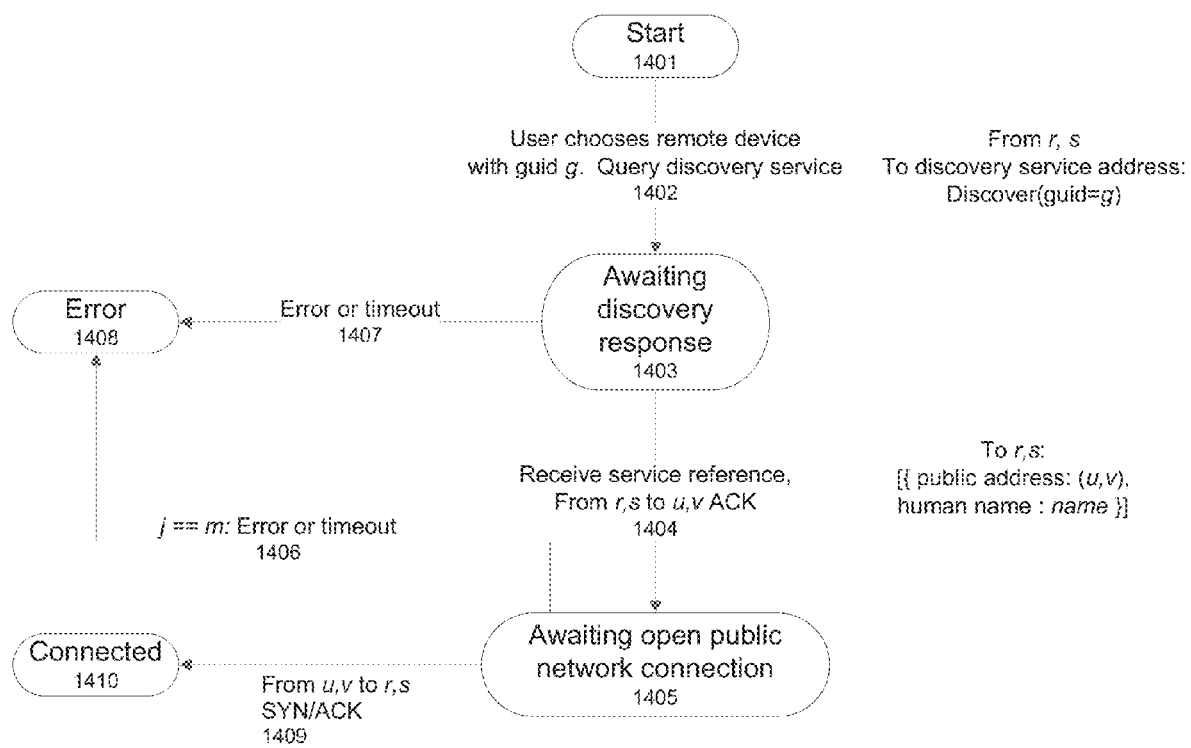
FIG. 14 presents a minimalist state machine for a sandboxed program implementing the direct embodiment to lookup a discoverable service's public address and other service information for a discoverable service believed to reside in a remote private network.

FIG. 13 shows the state machine for a sandboxed program looking up the current public address of a previously discovered service that is believed to not reside on the current private network, e.g., because it was returned in a preceding request to the discovery service for services on the same private network. If a timeout or error occurs while waiting for a response 1303 to a lookup on a GUID the state machine moves 1313 to the error 1314 state and stops: since there is only one public address once a request fails the centralized embodiment provides no further recourse for this service.

Figure 15:
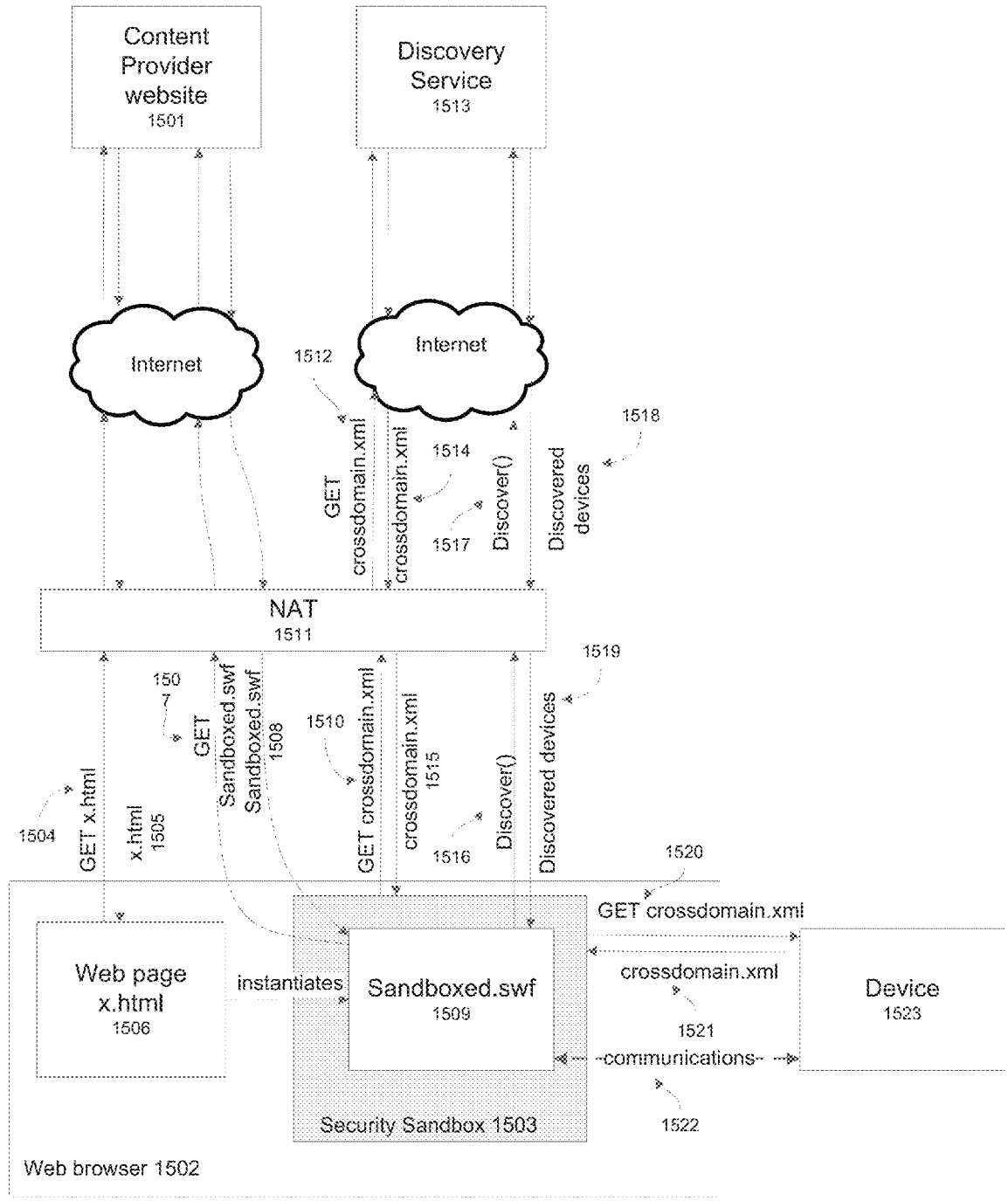
FIG. 15 provides an example of an embodiment where the security sandbox is Adobe Flash running within a web browser. The sandboxed program discovers a device running a discoverable service.

FIG. 15 shows a specific example of the direct embodiment. A web user surfs to a website 1501 downloads 1504 1505 a file x.html 1506 into his web browser 1502. The web page x.html 1506 contains markup that instantiates an instance of the Adobe Flash Player browser plugin passing "Sandboxed.swf." The Flash Player downloads 1507 1508 the Adobe Shockwave File (.swf) named "Sandboxed.swf" 1509 from the content provider's web site 1501. The "Sandboxed.swf" is written in Adobe ActionScript. The Adobe Flash Player runs "Sanboxed.swf" 1509 in a security sandbox 1503. To find devices in its network, "Sandboxed.swf" calls the discovery service 1513, e.g., using an ActionScript XML-Socket or URLRequest. Since the discovery service 1513 resides across the network, the security sandbox 1503 requests permission to call the discovery service by requesting the discovery service's crossdomain.xml file 1510 1512 1514 1515. If the discovery service permits any website to query it then it has a crossdomain.xml file semantically identical to the following:

<?xml version="1.0"?>
<cross-domain-policy>
<site-control permitted-cross-domain-policies="all"/>
<allow-access-from domain="*"/>
</cross-domain-policy>

Once the security sandbox 1503 interprets the crossdomain.xml file, assuming access is permitted the sandbox allows "Sandboxed.swf" 1509 to send a Discovery( ) query 1516 1517 to the Discovery Service 1513. Assuming device 1523 has previously announced to the Discovery Service and resides behind the same NAT 1511, the Discovery Service returns a list of discovered devices 1518 1519 containing the service information for device 1523.

Assuming the device 1523 has address (x,y), "Sandboxed.swf" 1509 references device 1523 as if it were a server using an URL http://x:y/ . . .

Before permitting any communication with device 1523, the Flash security sandbox 1509 performs an HTTP GET 1520 for the URL http://x:y/crossomain.xml and interprets returned crossdomain.xml file 1521. If the device allows communication from any website then the crossdomain.xml file 1521 is semantically identical to the crossdomain.xml file returned from the Discovery Service 1513.

Once the security sandbox 1509 has determined that communications are permitted, communication between the "Sandbox.swf" and the device commences.

Variations of the Direct Embodiment

As with variations of the centralized embodiment, a variation of the direct embodiment could omit the human name from the announce message with the same drawbacks.

In another variation, the announce message may omit the GUID, but when the GUID is omitted the sandboxed program lacks any identifier by which to lookup services on previously visited private networks. If no device communicates its GUID then there is no reason for the discovery service to maintain the mapping from GUID to service information and GUIDs may be omitted from all other communication.

A variation that omits both GUID and human name in announce messages is also possible with the drawbacks of both the variations that omit only one of the two.

Security and Spam Prevention: the Two Sandbox Extension

In the embodiments discussed so far, the sandboxed program is given the known addresses and/or the GUID of the discoverable service. Although the sandboxed program is limited regarding what it can do to its local node, the sandboxed program is allowed to communicate across the Internet. Any information given to the sandboxed program could become public knowledge including the public address and the GUID: potentially anyone can forever communicate with the discoverable service. This section extends the direct embodiment to limits access to the GUIDs and addresses of discoverable service.

One traditional way to prevent undesired access is to introduce usernames and/or passwords. This is a reasonable solution, however usernames and passwords are examples of user configuration—in this case the configuration is often called user registration. Particular embodiments are provided that avoid user registration.

For purposes of illustration this section hereafter limits the scope of the services addressed to those offered by entertainment devices. However, this does not preclude using any embodiments with other types of services.

A prominent example use of the proposed embodiments is to allow video web sites to find televisions in the user's home and then tell the TV to play a video. This TV has enough persistent storage to store content metadata: information about videos, such as titles, descriptions, and URLs from which the videos can be streamed. The IP-enabled, on-demand TV exports a discoverable service by which a caller can list, add or remove metadata. What are the threats posed by an attacker from somewhere on the Internet?

An attacker could add unsolicited metadata, delete metadata, or steal metadata the user has added to the TV thereby revealing viewing preferences.

IP-enabled Digital Video Recorders (DVRs) differ from IP-enabled on-demand TVs in that they have substantial persistent storage. If an IP-enabled DVR exports functions to the IP interface to list downloaded/recorded videos, download/record video, delete video, and share video then the attacker could steal a list of the videos a user has downloaded or recorded, consume storage with unsolicited videos, remove videos the user wishes to keep, or steal videos the user wishes to not share.

For most entertainment devices there appear to be three classes of attack: deletion, privacy invasion, and spam. The prior two could be damaging; the last is mostly annoying. In the worst case spam attacks could use up all storage on a DVR preventing desired recording.

A way to protect against deletion is to not export any deletion functions as part of the discoverable service. The easiest way to protect against privacy invasions is to not expose any metadata already in the device via the discoverable service. This leaves only spam attacks. The most damaging form of spam attacks can be mitigated by imposing resource restrictions. Do not allow newly added items to the device to consume more than allotted resources.

To address these threats consider a two-level security model for functions implemented by a device: protected and local. A local function is only available via interfaces that require the user's physical proximity to the device, e.g., buttons on the TV or on an infrared remote control. A protected function is available via IP as a discoverable service but only to programs running on nodes in the same private network, programs that know the device's public address, or programs that know the device's GUID. Functions that perform critical activities like deleting files would probably be local. Functions that add content or metadata, or that tell the device to play content are still sensitive to spam and are thus deemed protected.

Spam is prevented to the extent the system protects the GUID and public address of the device from untrusted, visited websites. Fortunately these pieces of information can be well protected using the constraints imposed by the security sandbox.

Sandboxed programs may not be permitted to communicate with other programs running within other security sandboxes except via a limited, mutually agreed programming interface enforced by the sandboxes.

A program running in a separate sandboxed program downloaded from a trusted website performs service discovery. Devices then only expose service information to the trusted website. This example assumes that the discovery service and the website delivering the discovery sandboxed program work together as a trusted entity. Particular embodiments hereafter refer to the discovery sandboxed program as the discovery agent.

Particular embodiments hereafter refer to this as the two sandbox extension. The two sandbox extension can be applied to the centralized and direct embodiments though this section presents it in the context of the direct embodiment.

Figure 16:
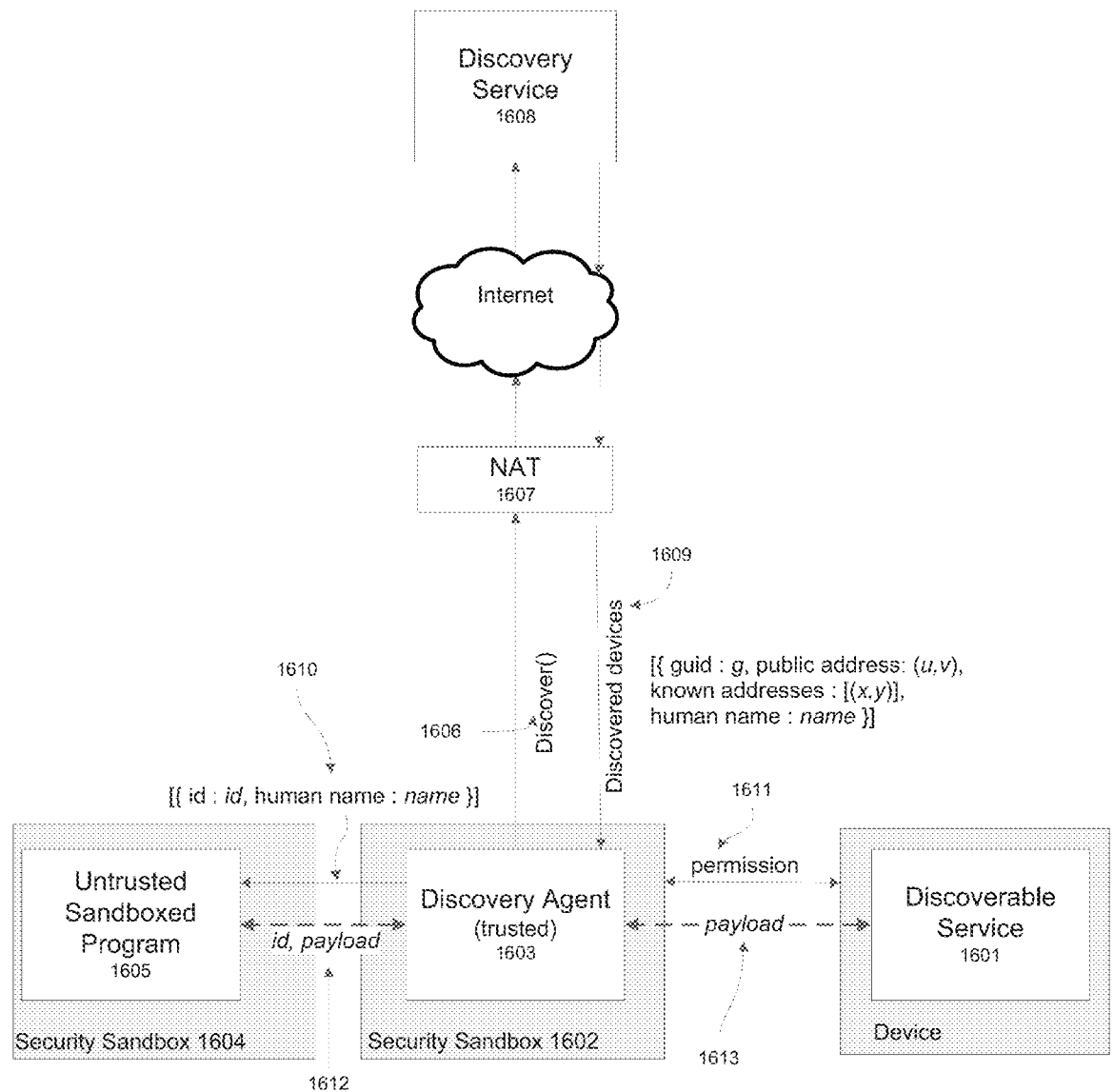
FIG. 16 illustrates the separate discovery agent extension to the direct embodiment.
Figure 17:
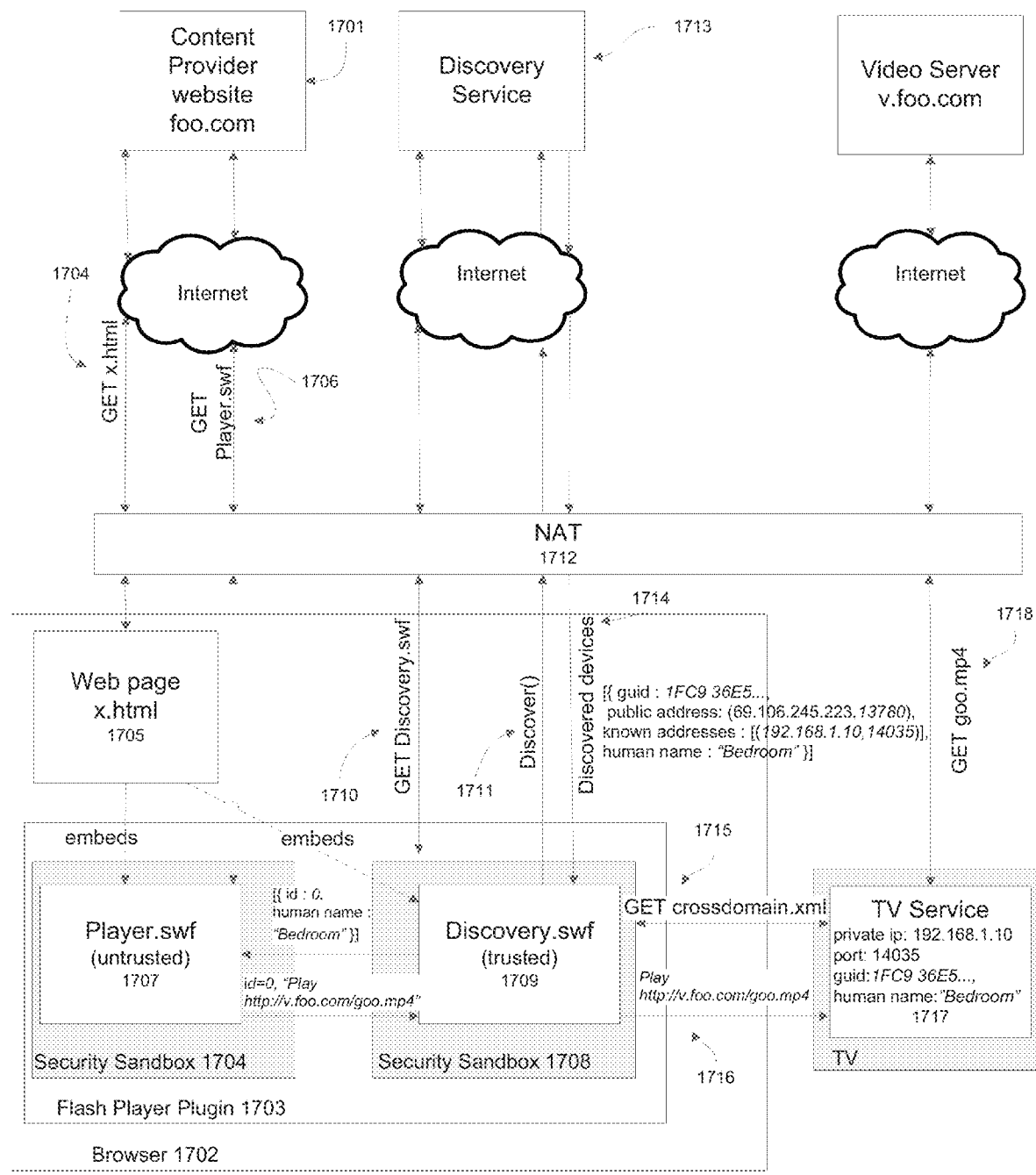
FIG. 17 illustrates the separate discovery agent extension as exemplified using Adobe Flash embedded in a web page.

FIG. 16 illustrates the two sandbox extension and FIG. 17 illustrates the TV example discussed in the previous paragraphs.

In FIG. 16, there are two sandboxed programs: untrusted 1604 1605 and the discovery agent 1602 1603. The two sandboxed programs communicate via a mutually agreed programming interface. The discovery service 1608 and discoverable service 1601 act the same as in prior embodiments and with any of the discussed extensions. The discovery agent 1603 calls Discover( ) 1606 on the discovery service 1608. The discovery service returns a set of discovered services 1609. The discovery agent remembers then strips everything from the discovery service response except the human names of each service. It then associates a locally unique identifier id 1610 with each human name. If the human names are ordered then the index in this ordering is a unique identifier. The purpose of including a separate id is to allow consistent identifiers while human names appear or disappear from the list across updates sent from the discovery agent during the lifetime of the untrusted sandboxed program.

Since the untrusted sandboxed program 1604 only has access to human names and local identifiers and those local identifiers are only meaningful to the discovery agent, the untrusted sandboxed program can only communicate with discovered services via the discovery agent. When the untrusted sandboxed program wishes to communicate some arbitrary payload to a discovered service, it sends the payload 1612 to the discovery agent with the id of the sandboxed program to which the payload should be sent. The discovery agent then forwards the payload 1613 to the discoverable service with or without the id and likewise the discovery agent forwards any response from the discoverable service to the sandboxed program.

If the untrusted sandboxed program leaks the human names to a third-party this does not compromise any address or global identifier that the third party could exploit to communicate with the discovered service.

FIG. 17 provides an example instantiation of the direct embodiment with the two sandbox extension. The example uses Adobe Flash using two SWFs: "Player.swf" 1707 and the discovery agent here named "Discovery.swf" 1707. "Player.swf" represents an untrusted sandboxed program as are all sandboxed programs downloaded from any server other than the discovery service. The user visits web page 1705, containing references to both SWF's causing the browser to start the flash player plug-in 1703. The flash player plug-in 1703 constructs a separate security sandbox 1704 1708 for each SWF. The flash player then loads 1706 "Player.swf" 1707 from the content provider website 1701, and then the flash player 1703 loads the discovery agent from the discovery service 1713. Once instantiated, the discovery agent 1707 queries 1711 the discovery service 1713. The discovery service then returns 1714 references to any devices residing behind the same NAT 1712 as the discovery agent, i.e., the discovery services return references to devices announcing from within the same private network.

The discovery service and the content website have different domain names and thus the flash player prevents the two sandboxed programs from communicating with one another except via a programming interface explicitly exported by each SWF. For example, the two SWFs can export JavaScript call interfaces using ActionScript's ExternalInterface:

ExternalInterface.addCallback("play", play);
function play(tv_id:int, video metainfo:Object): void { . . . }

The discovery agent might use the above code to export a call named "play" that allows "Player.swf" 1707 to tell the device to play content described by the video_metainfo argument. The video metainfo is represented as an URL in a "play" call 1716 passed from "Player.swf" identifying service with id=0 and then forwarded by "Discovery.swf" to the TV service 1717. The TV then downloads 1718 the video from foo.com's video server.

Similarly "Player.swf" 1707 might export a JavaScript call via which the discovery agent communicates references to newly discovered devices:
ExternalInterface.addCallback("tv_update", tv_update);
function tv_update(tv:Array):void { . . . }

Because all communications between the untrusted sandboxed program and the discovered service, e.g., the TV, pass through the discovery agent, the discovery agent stands in the unique position to enforce policy: preventing or modifying communications between the untrusted sandboxed program and the discovered service according to rules imposed by the user.

Figure 18:
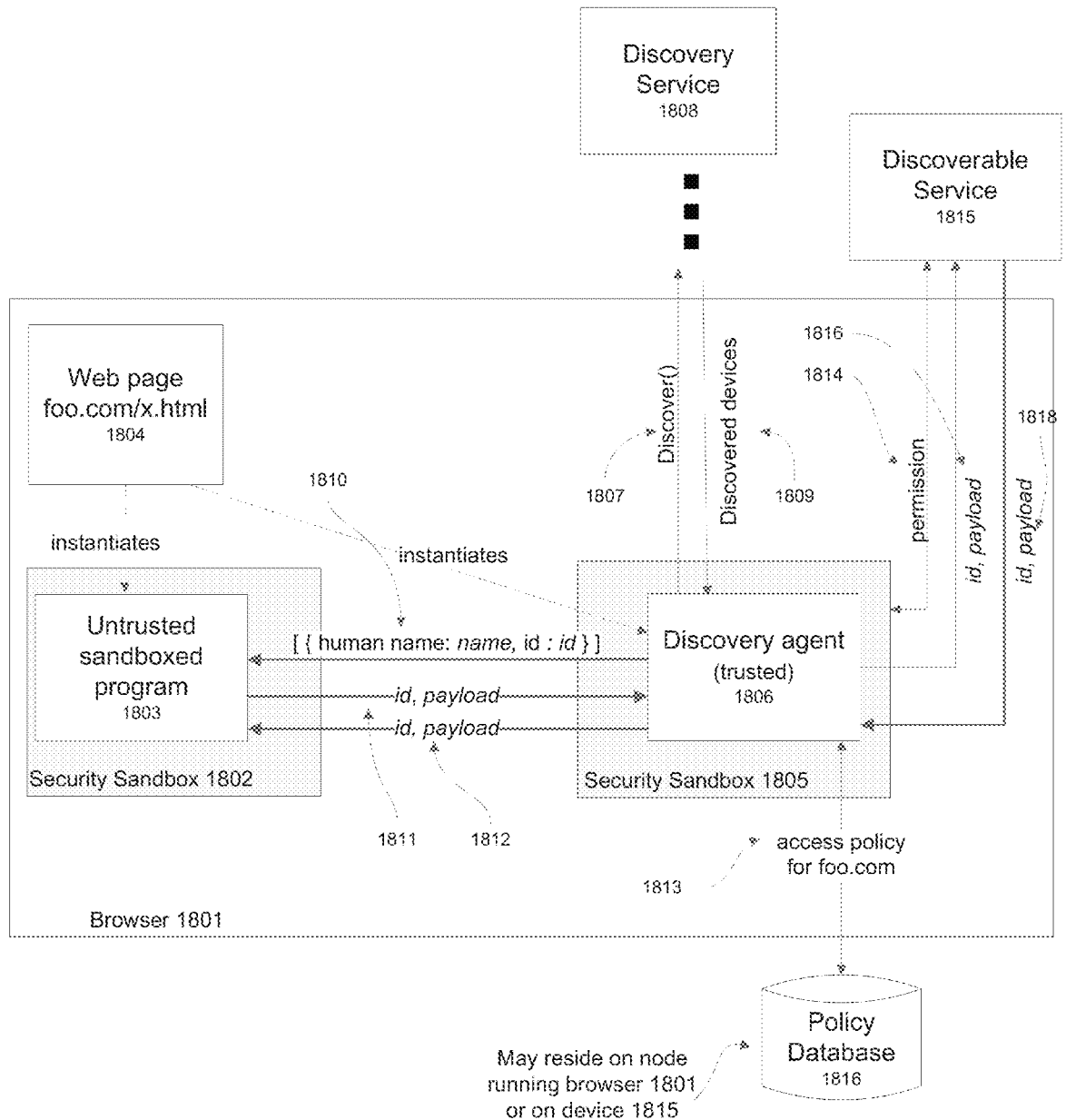
FIG. 18 illustrates the policy extension as used with the direct embodiment.

FIG. 18 illustrates a policy extension to the direct embodiment with the two-sandbox extension. Once the discovery agent 1806 has obtained references 1807 1808 1809 to discoverable services announcing from within the same private network, the discovery agent 1806 sanitizes the discoverable service references by replacing the globally unique identifiers with local identifiers and by removing all network routing information including each service's public and private IP addresses and ports. The discovery agent then passes the sanitized references to the untrusted sandboxed program 1803. Since the untrusted sandboxed program only knows locally unique information, it cannot directly open connections to the referenced devices and thus must forward all communications 1811 to discoverable service 1815 through the discovery agent 1806.

Upon receiving a communiqué the discovery agent 1806 determines the sender of the communication. For example with ActionScript, the discovery agent can determine the URL of http://foo.com/x.html 1804 via the ExternalInterface:
var page_url=ExternalInterface.call("eval", "window.location.href");
From page_url, the discovery agent 1806 extracts the domain name of the content provider website foo.com. The discovery agent then queries a policy database for access restrictions for foo.com. When there is no policy present in the database, the discovery agent may prompt the user. For example if the discovery agent 1806 is a SWF, the discovery agent could use ActionScript's ExternalInterface to prompt the user with a confirm modal dialog box asking whether a website is allowed to send a video to a TV:
var allow:Boolean=ExternalInterface.call("confirm", "Allow"+domain_name(page_url)+"to send video to your TV?");
update_policy(domain_name(page_url), allow);
if (allow) send_to_tv( . . . );
In the code snippet above, update_policy stores policy for domain_name(page_url). domain_name(page_url) returns the domain name portion of page_url.

The policy database can reside in persistent storage on the computer running the discovery agent or the policy database can reside in the device on which the discovery agent runs or the policy database can be distributed across both. When the policy device is in the computer running the discovery agent, the policy moves with the personal computer (e.g., a laptop) and can be applied across devices. When the policy is stored in the device running the discoverable service, the policy can apply to all users of that device. Furthermore policy stored in the personal computer is available before communication with the device is achieved and can thus be used to rapidly remove unavailable user options, but a policy database on the personal computer is also limited to the constraints imposed by the sandbox. Adobe Flash, by default, limits each website to 100 KB. This is sufficient to locally store domain names and a few associated Boolean access flags for thousands of web sites. Unfortunately if the user clears Adobe Flash website storage then all policy is lost. A device may have much larger storage for policy and is less likely to allow a user to accidentally delete all policy.

"Player.swf" 1707 may be replaced with any sandboxed program including those not running in Adobe Flash. Likewise the discovery agent 1709 1806, may be written in any language and run-time environment that imposes a security sandbox. The device references 1714 1809 returned from the discovery service 1713 1808 contain all of the information illustrated in FIG. 3 (see messages labeled 310 and 311), or subsets of this information as described in Section 0. In this example, the discovery service communicated references to TVs, but the device can be any device. Furthermore, the communications need not be limited to communicating "play" messages but rather anything that can be communicated over a network.

Sharing Discovery State Across Web Pages and Domains

In the example in FIG. 17, the discovery agent 1709 is a SWF downloaded from the discovery service 1713. SWFs run in an Adobe Flash sandbox. Adobe Flash allows Discovery.swf to access state stored by Discovery.swf regardless of which website embedded Discovery.swf. Disocovery.swf could thus store a query result from foo.bar and reuse it at bar.com. Since Discovery.swf may be cached, the user may be able to surf the web without contacting the discovery service on every page load that contains Discovery.swf.

Sharing state between page loads also enables a user to visit a network once and be able to communicate with a discovered service when the service is no longer in the same private network and thus does not appear in a response from the discovery service.

Variations on the Two Sandbox Extension

The discovery agent may have its own UI for selecting discoverable services. The sandboxed program may communicate what it wants to communicate to the discovery agent, which then forwards to the discoverable service. In this variation the untrusted sandboxed program is not even told a locally unique id or human name of any discoverable services.

As another Adobe Flash example of the two sandbox extension, the limited, mutually agreed programming interface between the two sandboxes could use the LocalConnection class rather than JavaScript. However, any limited, mutually agreed programming interface suffices.

Remote Communications

Problems related to communicating between nodes with one or more intervening NAT are generally known as NAT traversal problems. This section describes how the direct embodiment enables a client that previously discovered a service to communicate with that service when the client and service no longer reside in the same private network. Such communication by the definition of private network implies traversing one or more NATs. This section then discusses embodiments that handle a wider array of NAT traversal problems.

When contacting a service's known addresses fails and the service does not appear in the response to a query for local private network services, the sandboxed program assumes the previously discovered service resides in another private network or is no longer operational.

In the direct embodiment illustrated in FIG. 3, the service information returned in response to Discover( ) 310 311 contains each service's GUID. The GUID is a globally unique identifier that persists across time and across network changes, and thus can be used to identify a service even when the service is no longer in the same private network. Because the identifier persists across network changes, its value is independent of network routing, and thus to route packets to a service not on the same private network requires mapping the GUID onto the service's public address. As shown in FIG. 2, the discovery service maintains a mapping from GUID to service information that includes the service's public address 208.

Figure 19:
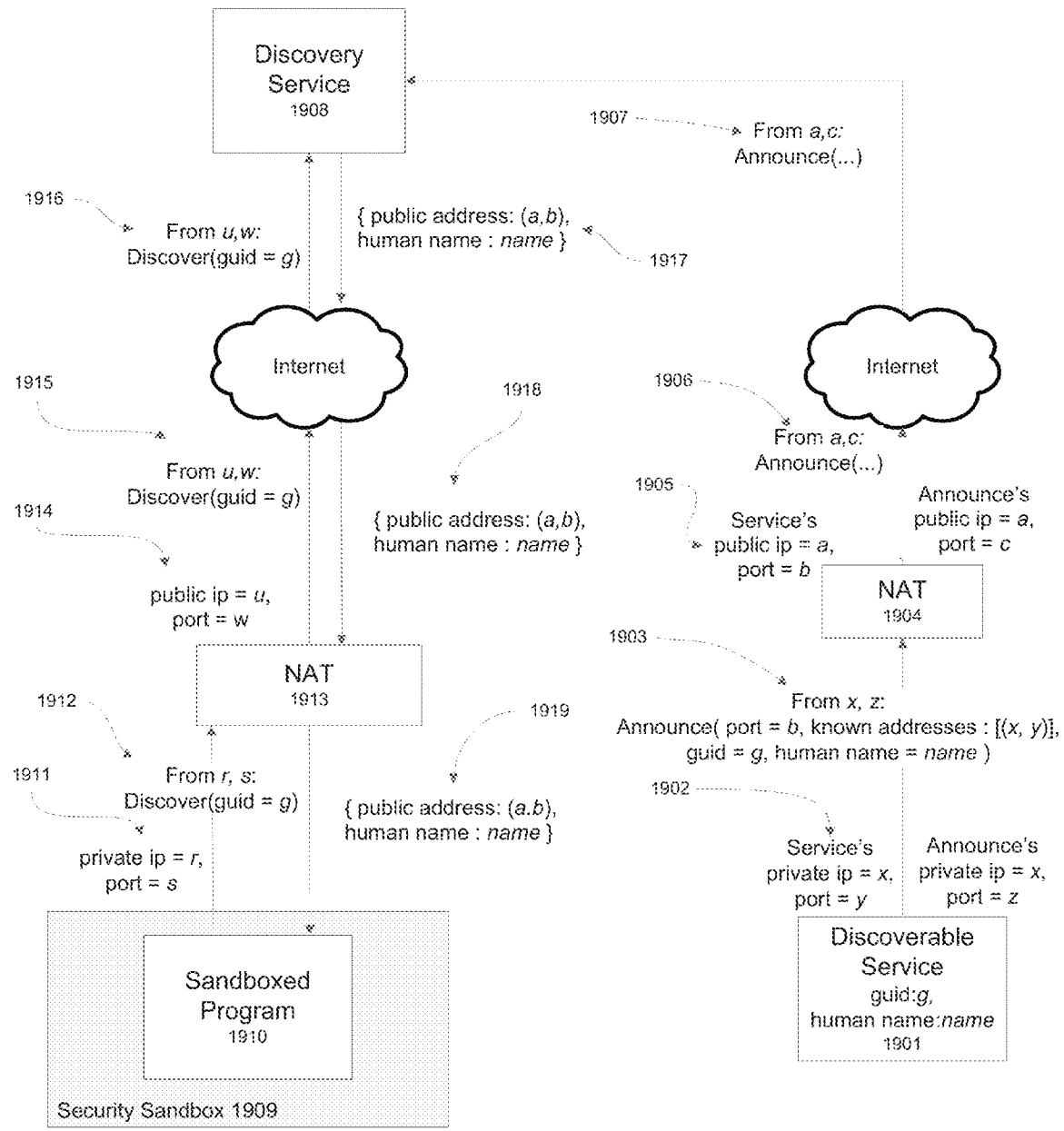
FIG. 19 illustrates announcing and discovery with the remote extension to the direct embodiment.

FIG. 19 illustrates the process used by the direct embodiment of discovering service information based on GUID. The device 1901 901 announces using the same process as illustrated in FIG. 9. The discoverable service 1901 communicates its service's private addresses 1902 902, the public port mapping setup in the NAT (discussed momentarily), the GUID and the human name 1903 1906 to the discovery service. As the packets communicating this information pass through the NAT 1904, the private IP and port 1902 that were placed in the IP headers are mapped onto the public IP of the NAT and a port mapped for the service's announce 1905. The discovery service 1908 then stores the service information including the GUID in the two mappings 908 and 909. When the sandboxed program 1910 queries passing the GUID 1912 1915 1916, the discovery service maps 908 from GUID to the service information and returns the service's public address and human name 1917 1918 1919. Once the sandboxed program has the service's public address, it may open a connection to that address over which it communicates with the service.

A port mapping is the mapping between a private ip-port to one of the NAT's public IP addresses and one of the NAT's public ports. A NAT usually sets up a port mapping automatically when a program inside the NAT's private network initiates a TCP connection or starts a UDP packet exchange with any node outside the private network. However when a packet arrives on one of the NAT's public network interfaces bearing a port number for which there exists no mapping, the NAT typically discards the packet. There is one exception: some NATs implement a way to designate a single node within the private network to handle all packets that arrive on a public port for which there exists no port mapping. Forwarding all packets addressed to unmapped ports to a particular private node is sometimes called placing the private node in the DeMilitarized Zone (DMZ). Some NATs support mechanisms for explicit port mapping, whereby an application running within the NAT's private network can tell the NAT to establish a port mapping without initiating a connection to any particular node outside the private network. NAT-PNP and uPNP specify mechanisms for explicit port mapping. NAT-PNP and uPNP are preferable to placing a node in the DMZ since placing a node in the DMZ opens that node up to various security threats.

Because a user trying to communicate with a service running on a different private network is initiating a connection via a NAT, the NAT must either be particularly unrestrictive (e.g., implementing a DMZ) or it must provide explicit port mapping. This section later describes embodiments that do not require explicit port mapping.

If a NAT does not support NAT-PNP or uPNP, most NATs provide a web user interface by which user's can manually set up port mappings or designate a device responsible for all packets to unmapped ports. NAT-PNP or uPNP are obviously preferable since they do not require any user configuration.

Figure 20:
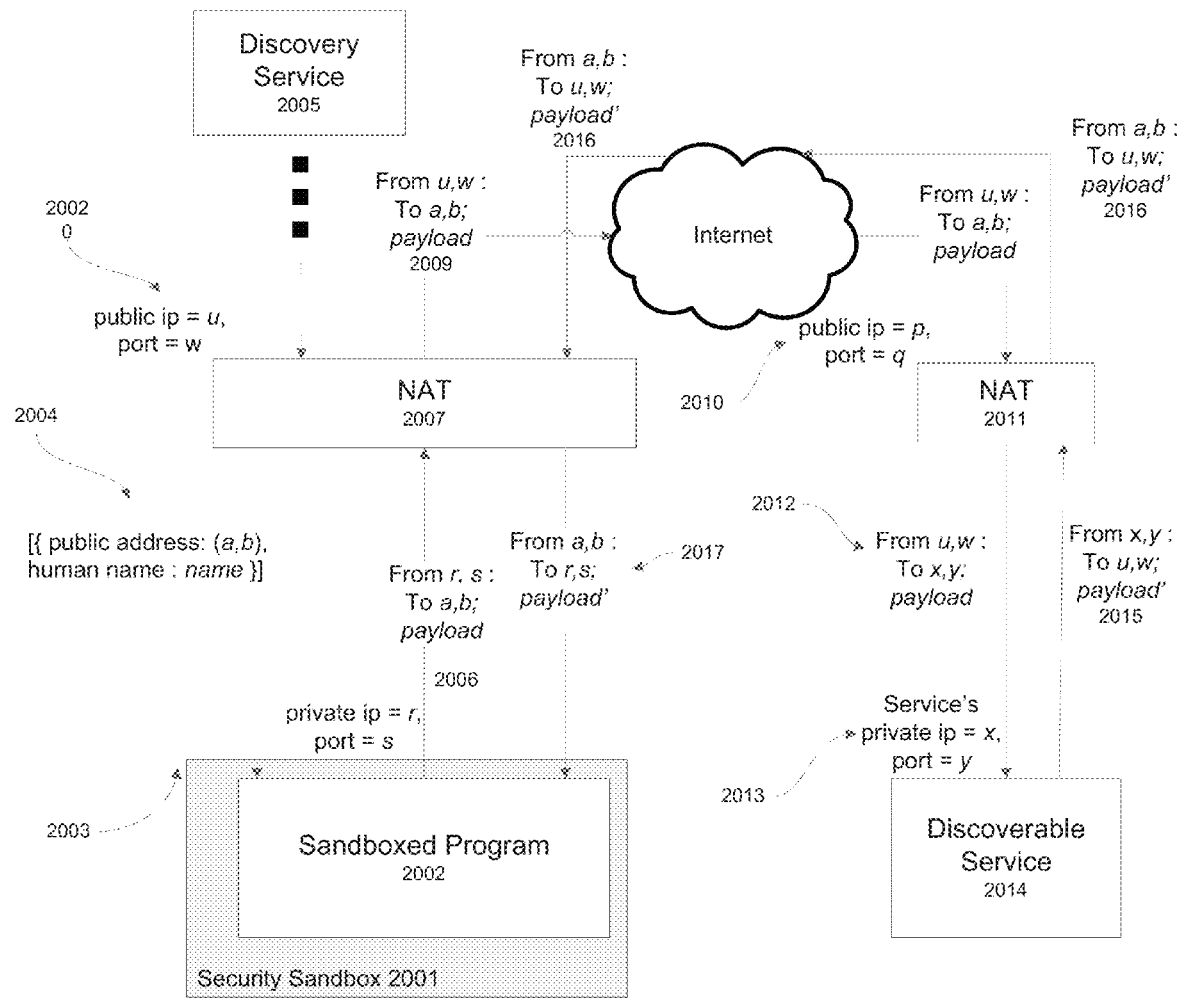
FIG. 20 illustrates direct communication between a sandboxed program and a discoverable service on different private networks.

FIG. 20 illustrates a sandboxed program opening a TCP connection to and then communicating with device 2014 on another private network assuming a port mapping exists in NAT 1904 2011 from the device's public address (p,q) to its private address (x,y). The sandboxed program 2002 obtains the public address of the device 2014 from the discovery service 2005. The sandboxed program establishes a connection by sending a packet containing a TCP SYN 2006 addressed from the sandboxed program's node's private address (r,s) to (x,y). Since the connection initiator is within NAT 2007's private network, the NAT automatically creates a port mapping from the connection's private address (r,s) to the NAT's public IP address u and a newly allocated public port w. NAT 2007 then replaces the sandboxed program's private address (r,s) with (u,w) in the SYN's IP and TCP headers. The NAT then forwards the newly addressed SYN packet 2009 across the Internet to NAT 2010.

Assume prior to the events depicted in FIG. 20, explicit port mapping or user manual configuration was used to setup up a port mapping in the NAT between public address (p,q) and the service's private address (x,y). Because a port mapping exists when the SYN arrives at NAT 2010, the NAT replaces the destination address (p,q) with the discovered service's private address (x,y) and forwards the SYN 2011 to the private network and on to device 2012. The discovered service running on device 2012 responds with a SYN/ACK 2013 2014 addressed to the source address (u,w) taken from the received SYN. When SYN/ACK 2014 reaches NAT 2007, the NAT uses the mapping that had been created by the initial SYN 2006, to forward the SYN/ACK packet 2015 back to the sandboxed program 2002 running at (r,s).

Once the SYN/ACK arrives, the sandboxed program acknowledges the SYN/ACK. The ACK to the SYN/ACK follows the same path through the illustration as the initiating SYN. At this point, the connection has been established between the sandboxed program and the discovered service on device 2012.

Once the connection has been established, communication commences. What is communicated is orthogonal to the discovery process.

FIG. 20 illustrates how the direct embodiment with the addition of explicit port mapping handles NAT traversal across two NATs: one sits between the sandboxed program and the public Internet and the other between the discoverable service and the public Internet. The cases where 1 or both NATs are omitted are degenerate cases that are easily handled: when there is no intervening NAT between a party and the public network, the party's private address and public address become one.

Multiple NATs between the sandboxed program and the public Internet represents little difficulty in practice since the sandboxed program initiates communications 2008. However, explicit port mapping may fail when there are multiple NATs between the discoverable service and the public Internet.

The direct embodiment without explicit port mapping often requires some form of manual user configuration to permit remote access over TCP.

The next section considers embodiments that can traverse a wider variety of NAT scenarios.

Advanced Nat Traversal

NATs implement port translation in various ways. For all descriptions consider the case when a private node initiates communications by sending a packet bearing private source address (x,y) and publicly routable destination address (a,b). The most restrictive NATs are sometimes called symmetric NATs. With symmetric NATs, the mapping exists only between (x,y) and (a,b). Packets arriving at the NAT from the public network with destination (x.y) but with source address other than (a,b) are discarded. Symmetric NATs are the most difficult to traverse and we propose only one embodiment that can traverse such NATs: the global message queues embodiment.

The global message queues embodiment extends the direct embodiment as well as any of the other embodiments discussed with a message queue for each service that announces to the discovery service. A message can contain arbitrary information and the message can span a single packet or multiple packets. The message queue stores the message for at least long enough for a normally operating discoverable service to poll the queue and download any pending messages. The message queue solution casts both the sandboxed program and the discoverable service in the role of communication initiator: the sandboxed program initiates communication to push the message; the service initiates communications when it polls. Thus the NAT traversal will succeed for almost any NAT including symmetric NATs by virtue of NAT's automatically establishing port mappings for communications initiated from within any of a NAT's private networks.

Providing a global message queue per discoverable service has unique benefits that make it useful in combination with all of the NAT traversal techniques we discuss:

It gracefully handles devices that are periodically unavailable, e.g., powered off part of the day.

It works with almost every NAT.

However, the global message queues embodiment has a number of drawbacks that make it the logical last resort when attempting to communicate with a device:

If the global message queue is to provide reliable message delivery then the global message queues require storage of messages for all otherwise unreachable devices until a time has passed that is substantially longer than the typical time that devices remain unpowered. This introduces the need for systems with reliable persistent storage.

It introduces a new piece of central infrastructure that must be maintained.

The global message queue service must scale to handle periodic polls from every discoverable service, i.e., every device running at least one discoverable service, even for devices for which no messages have been pushed.

The global message queue introduces latency in delivering messages as long as the poll period for devices that are active (e.g., powered on), and longer for devices that are temporarily inactive.

Some of these drawbacks are no worse than the drawbacks of a global discovery service, since it represents central infrastructure that too must scale to handle periodic announces from all discoverable services. However the global discovery service can be completely implemented with soft state and thus does not require persistent storage.

As an example, global message queues can be implemented using Internet electronic mailboxes, a.k.a. email mailboxes. Global message queues have not previously been designed for use with a sandboxed program, and thus to work global message queues are extended to return "explicit permission to communicate." For Adobe Flash, this means the global message queue must return a crossdomain.xml file. Extending a global message queue to return "explicit permission to communicate" and in particular return a crossdomain.xml file is novel.

Consider a less restrictive NAT that forwards all packets addressed to public address (x,y) regardless of each packet's public source address. Such NATs are sometimes referred to as full cone NATs. In another embodiment, the discoverable service announces to the discovery service with a source port that is bound to the same port on which the discoverable service listens, i.e., port y=z in FIG. 20. z is no longer ephemeral, and v=w. By doing this, the announce to the discovery service establishes the port mapping that is used by remote sandboxed programs to initiate communications with the discoverable service.

In yet another embodiment, the discovery service periodically sends a SYN to a random maybe unreachable or nonexistent public IP address but from the port on which the service listens, i.e., port y in FIG. 2, in order to establish the port mapping.

Additional embodiments can incorporate any subset or all of the following NAT traversal mechanisms: Simple Traversal of UDP over NATs (STUN), "STUN and TCP too" (STUNT), port prediction, and TURN.

With STUN, a STUN client on a private node contacts an a priori known STUN server. The STUN server interrogates the private node to determine what kind of NAT(s) might reside in the path between the server and the private node. By this means, a service running on a private node can learn its public address on its outermost NAT and whether it is likely that other nodes would be able to communicate with the service via this public address. Via some external mechanism, the service communicates the public address to peers that might want to contact the service, e.g., our proposed discovery service could be used. The discovery service by virtue of returning the public address already provides much of the relevant functionality provided by STUN. However, an embodiment that uses STUN to discover the public address and then communicates the public address via our discovery service is novel.

STUN by itself does not provide any mechanism for traversing more restrictive NATs like symmetric NATs. STUN is also not designed for use with TCP. Even if the discoverable service speaks UDP, the sandboxed program is limited to HTTP over TCP. There is no guarantee that a public address returned by STUN correlates to a public address available for incoming TCP connections from remote sandboxed programs.

With STUNT, the client uses UDP and TCP to communicate with a server sitting on the public network. This server implements STUN plus it listens for TCP connections. The server communicates back to the client the client's public addresses for the TCP and UDP exchanges with the server. The client then communicates via an external mechanism typically the Session Initiation Protocol SIP to tell a peer to attempt to establish communication. The client and the peer simultaneously or near simultaneously send packets to each other using each other's respective public addresses. This initial exchange sets up mappings in the intervening NAT(s): the process is sometimes called hole punching. Sometimes the hole punch succeeds and further bidirectional communication can commence. When a hole punch attempt fails, the client and peer may attempt communicating on port numbers neighboring the public port numbers to exploit port allocation patterns in many NATs: this is called port prediction.

A STUNT embodiment combines the TCP-part of STUNT with the direct embodiment. STUN and STUNT are not designed to communicate with sandboxed programs, as such in the STUNT embodiment, the STUNT server provides the sandbox with explicit permission to communicate. A flash-reachable STUNT server speaks HTTP and returns a sufficiently permissive crossdomain.xml file. Extending STUNT to communicate with a sandboxed program is novel.

Although STUNT can sometimes penetrate NATs, it depends on the effectiveness of port prediction. STUNT will not work with symmetric NATs that have random port allocation patterns. The only way to ensure communication can take place is to fall back to a global message queue or to a relay. A relay sits on the public network forwarding packets back and forth between a private node and private or public nodes anywhere on the network.

A TURN server acts as a relay. Assume a private node P with private address P' sits behind a NAT that does not allow public nodes to establish connections to P. Assume also that a TURN client runs on P. The TURN client initiates communication with the TURN server thereby establishing a mapping in the NAT between the private node and the TURN server. The TURN server can now talk to P whenever it wants so long as the TURN client maintains the mapping by periodically talking to the TURN server. The TURN server then listens on a public address P'' on behalf of P. P' and P'' differ in that packets address to P'' are routable over the public Internet. The TURN server forwards any packet sent to P'' to P via the existing mapping in the NAT. Relay solutions such as TURN can traverse even symmetric NATs with random port assignments; however, all relay solutions are quite heavyweight and should only be used as a last resort, or as a second-to-last-resort if global message queues are also employed in the system. Message queues (as defined) differ from relays such as TURN servers in that message queues are polled by the discoverable service whereas a relay forwards packets or messages as soon as they have been received. Message queues may store messages until they can be delivered and are thus better at reaching temporarily-powered-off discoverable services.

In a TURN embodiment of the proposed invention, a slightly-extended TURN server relays communications between a sandboxed program and the discoverable service. As with STUN, a TURN server must be sandbox-reachable, and with Adobe Flash this implies that a flash-reachable TURN server must return a crossdomain.xml file and must be able to perform all communications over HTTP. Extending TURN to communicate with a sandboxed program is novel.

Interactive Connectivity Establishment (ICE) (21) combines STUN and TURN. It is trivial to consider an embodiment that combines both the STUNT embodiment and the TURN embodiment and call this the ICE embodiment. Extending ICE to function within the constraints imposed by the security sandbox is extending STUNT and TURN in the aforementioned ways and thus is novel in the same ways.

STUNT, TURN, and ICE provide no mechanisms for discovering STUNT or TURN servers. STUNT or TURN servers could announce to the discovery service in the same manner as discoverable services.

TURN is a specific kind of relay and may be more complicated than is needed for communication establishment in some embodiments. A scalable simple relay embodiment in which each simple relays has a sandbox-reachable interface and optionally a TCP interfaces is provided. When a simple relay has a TCP interface that is less restrictive than the sandbox-reachable interface then it is called the simple relay TCP interface. TCP is distinguished from sandbox-reachable (e.g., HTTP for Flash) because the sandbox reachable interface may be more restrictive than TCP.

In the simple relay embodiment and the simple TCP relay embodiment, the discoverable service opens a connection to the relay and sustains mappings in intervening NATs by periodically sending keep-alive messages in the connection. When a message arrives on the sandbox-reachable interface from a sandboxed program, the message is forward via the TCP connection to the discoverable service. The simple relay embodiment and the simple TCP relay embodiments are similar to the TURN embodiment except that they do not limit the scope to the specifics of TURN.

In the simple UDP relay embodiment, the discoverable service communicates with the relay using UDP rather than TCP or falls back to TCP when UDP fails. As with the simple relay and simple TCP relay embodiments, the discoverable service periodically sends keep-alive message to maintain mappings in any intervening NATs. When a sandboxed program queries the discovery service the returned service information contains the discovered service's public address and the picked relay's IP and port, i.e., all state related to the mapping in the relay. The sandboxed program then can communicate the state in each message thereby eliminating the need for the relay to retain any per-discoverable-service-state. Stateless systems also typically have simpler failover. When a simple relay fails, the discoverable service sees the failover at the end of the next keep-alive period and can switch to a different relay without needing to reestablish any state.

With the TURN, simple relay, and simple TCP relay embodiments, the relay keeps TCP connections open to each discoverable service, and thus the relay must maintain TCP-related state such as retransmission timers and send windows for each such discoverable service. State maintenance overhead can grow quite large compared to the simple UDP relay embodiment.

In the GUID-relay embodiment, the discovery service is combined with the relay service: discoverable services announce to the relay, the relay maintains a mapping from each GUID to the associated discovery service's public address, sandboxed programs then send messages bearing the discoverable service's GUID as the destination address, and the GUID-routing-relay immediately forwards the messages to the discoverable service's public address. Using the GUID as a destination address is orthogonal to whether discoverable service announce using UDP or TCP, thus there are TCP GUID-routing-relay and UDP GUID-routing-relay embodiments.

The GUID-relay must maintain discoverable-service state, but in the case of UDP this is no more state then would have to be maintained for the GUID mapping any of the discover service embodiments that maintain a GUID mapping.

Using a sandbox-reachable interface on one side to talk to sandboxed programs, and using UDP to talk to discoverable services is novel.

Retractable Access without User Accounts

In embodiments discussed so far, the GUID is sufficient to identify and establish communications with a discoverable service. However, there may be nothing to identify the user or the sandboxed program to the discoverable service.

For example, Alice owns a discoverable television. Alice's TV provides a discoverable service that allows sandboxed programs to tell the TV to download a video. Spammy visits Alice's house with his laptop. He visits a web site that loads Discovery.swf. Spammy discovery agent now has the GUID of Alice's TV. After Spammy leaves the Alice's home, much to Alice's disappointment, Spammy proceeds to litter her TV with unsolicited content.

One solution to this problem is to require password-protected user accounts for anyone with access to a discoverable service. This however introduces the burden of setting up accounts. Imposing user account registration for something as harmless as occasional visits from spammers seems like overkill. A less burdensome solution allows anyone to communicate with the discoverable service, and then allows the discoverable service to identify and exclude those that abuse the access.

Figure 21:
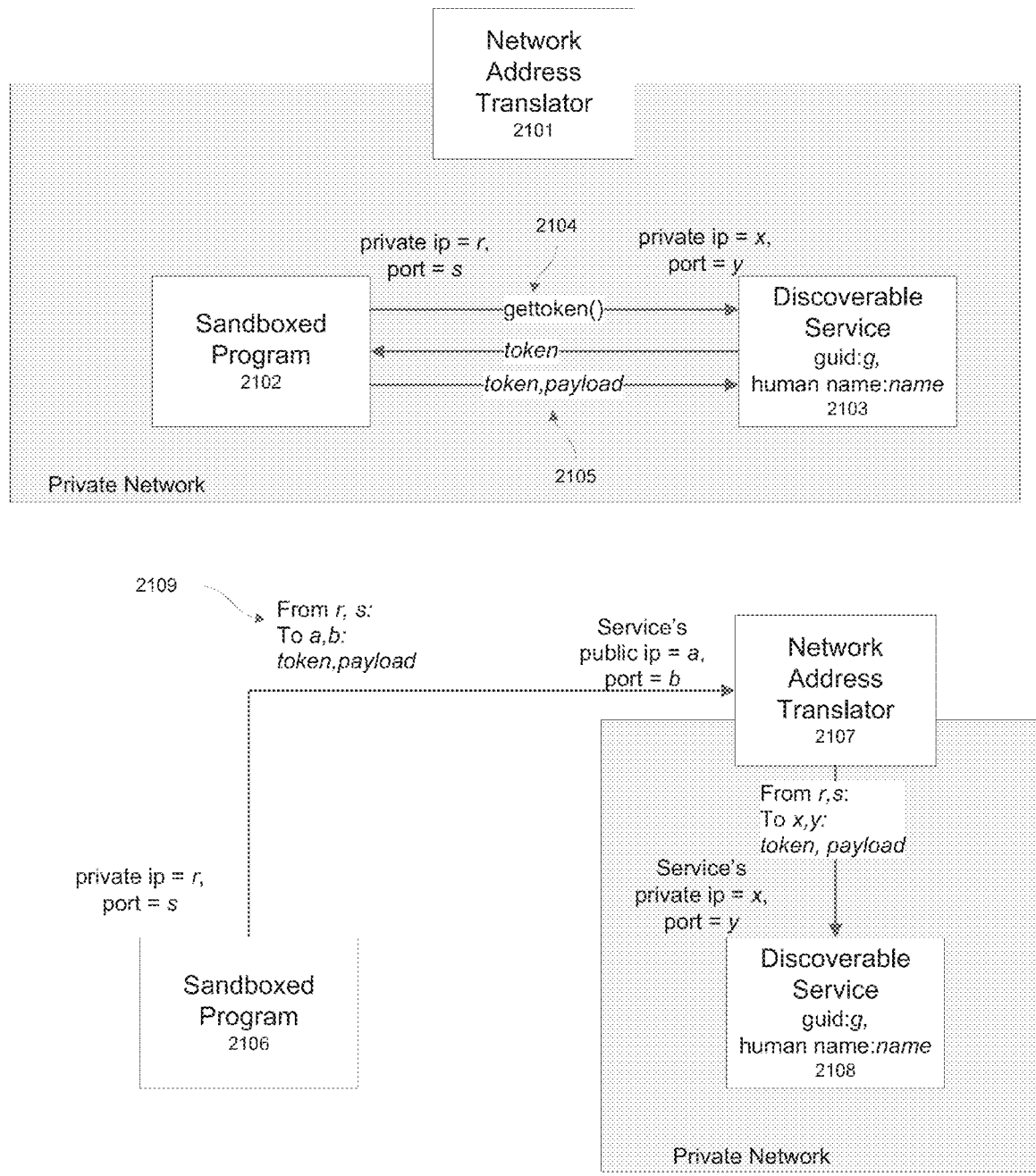
FIG. 21 illustrates the retractable access extension to the direct embodiment.

With the access-token-extension, the discoverable service requires the sandboxed program to pass an access token in any message excepting messages soliciting access tokens. An access token may be an opaque bitstring from the view of the sandboxed program, but to the discoverable service it uniquely identifies the message sender. The access-token-extension may be used with any embodiment discussed so far. FIG. 21 illustrates a sandboxed program requesting and obtaining an access token 2104. In subsequent communications 2105, the sandboxed program 2102 passes along the access token. FIG. 21 shows the sandboxed program and the discoverable service on the same private network, but the decision of when to offer access tokens is a matter of policy. In FIG. 21 when the sandboxed program 2102 2106 communicates remotely 2109 with the discoverable service 2108, the sandboxed program passes the along the access token.

In one extension to the access-token-extension, the sandboxed program employs the policy of only granting access tokens to sandboxed programs running on nodes in the same private network, i.e., as illustrated in FIG. 21. Thus Spammy could obtain an access token when he is in Alice's home, but not before. This is called the private-grant access-token extension and is an instance of the access-token extension.

The local-grant access-token extension further restricts granting access tokens only to sandboxed programs running on nodes in the same local area network as the discoverable service. In home environments there is often one NAT and one local area network behind the NAT, in such cases the local area and private networks are the same. Because the discoverable service and the sandboxed program communicate over a single local area network, any frame from the sandboxed program arriving at the discoverable service's node contains the hardware address of the sandboxed program's node. Since hardware addresses are generally assigned by the manufacturer, are often left unchanged by users, and in many cases are not changeable, the hardware address may be used as a long-term pseudonym for a user, albeit the hardware address is an imperfect pseudonym as it conflates multiple users on the same node. When the discoverable service grants an access token, it may derive the token from the hardware address or it may remember the token granted to each hardware address. If a node loses its token, whether due to mischief or happenstance, the discoverable service can reissue the same access token to the sandboxed program(s) on that node thereby maintaining the pseudonym for a user (or users) across browsers, system crashes, browser cache erasures, and reboots into different operating systems.

With the local-grant access-token extension, not only is Spammy's laptop only able to send spam once it has operated in Alice's home, but Alice can also retract Spammy's laptop's access to her TV forever even if Spammy happens to clear his access tokens before revisiting Alice's home.

The access token may not only uniquely identify the user or his sandboxed program(s), but must also not be guessable or derivable by other sandboxed programs; else any sandboxed program could hijack access tokens or could generate its own access tokens outside the scope of the discoverable service's access control policy. Preventing hijacking means the token should be kept reasonably private by the sandboxed program: assuming attackers do not have access to intervening network hardware, the access token could be stored locally to the sandboxed program and transmitted only in packets from the sandboxed program destined to the discoverable service. If the intervening network is considered untrustworthy then the access could be encrypted whenever transmitted using shared key. The shared key would only be known only to the sandboxed program and the discoverable service. There are many ways to generate access such that the discoverable service can verify that they were previously issued by the discoverable service. The various methods for token generation are orthogonal to this proposed extension, although two example techniques are provided: 1) the discoverable service draws tokens from a long highly random pseudorandom sequence seeded with a secret known only to the discoverable service, 2) the discoverable service uses a key-Hashed Message Authentication Code (HMAC) as the access token where the key used in generating the HMAC is known only to the discoverable service and the input message to the HMAC algorithm is the sandboxed program's node's hardware address.

To ensure users include the access token, the policy is imposed that the discoverable service discards, reclassifies, or otherwise applies policy to all remote communications without an accompanying access token 1309 issued by the discoverable service 1303 1308. Another policy that the discoverable service only issues access tokens to sandboxed programs on the same private network may also be used.

Exploiting User Accounts

In lieu of or in addition to access tokens, the discoverable service could choose to offer access only to authenticated, registered users. Many mechanisms exist to authenticate users. In the context of service discovery, with an account all policy and knowledge of discovered services can follow the user between machines. For example, Alice's laptop at home discovers her TV. From the laptop she registers with the discovery service. The sandboxed program on her laptop associates her TV with her discovery service user account. When she goes to work, she visits a website that runs a sandboxed program that uses the discovery service. She provides her login information to the sandboxed program and the sandboxed program then downloads from the discovery service the reference to her TV at home.

Remote access scenarios discussed with previous embodiments assumed that the user took the computer with him or her. If Alice takes her laptop to work then no user registration is necessary to reach her TV at home because her laptop already knows the TV's GUID and its public address if the address has not changed.

Multiple Nats

A node might be behind the same NAT that connects to the public Internet, but reside on a different private network from other discoverable services. Embodiments that include a relay or message queue can handle multiple private network behind the same public address by using the relay whenever direct communication fails.

Using Ranges or Prefixes Rather than Nat Public IPS

Not all discoverable services are behind a NAT. When a discoverable service's private and public addresses are identical, a discoverable service knows it resides on the public Internet, i.e., not behind a NAT. In most proposed embodiments in this application, a discoverable service can learn its public address by querying the discovery service.

With the ip-range-extension, when a discoverable service finds itself on the public Internet, the discoverable service announces itself to a range of public IP addresses by sending an address range or address prefix in its subsequent announces. With this extension, in query responses the discoverable service returns all discoverable services that announced to a range or prefix including the requestor's public address. The ip-range-extension can be combined with any embodiment or extension discussed in this application.

Deciding on the appropriate range may be left up to a user configuration in order to allow the device to be discovered across arbitrary IP address prefixes or ranges.

Advertisement Targeting, Recommender Systems, and Exposed Addresses

With embodiments derived from the direct embodiment, if the sandboxed program and the discoverable service run on nodes in the same local area network then the discoverable service can have access to the sandboxed program's node's hardware address. The hardware address may be used as a pseudonym for the user. This pseudonym could be used not only for imposing access control policy, but also to identify the user to recommender and advertisement targeting systems. With the world wide web, browsers hide the hardware address as well as any other form of permanent or semi-permanent pseudonym from web sites in order to protect user privacy. However, there is no way to protect a user's node's hardware address from other nodes on the same local area network. Thus discoverable services have an advantage not available to the world wide web for targeting advertising.

For example, when Alice visits a video website and pushes a video to her discoverable TV from her laptop in her home's local area network, the hardware address as pseudonym gives the TV an indicator that Alice as opposed to her husband will watch the pushed video. This identification mechanism is not available to existing Internet TV platforms.

Capability-Based Discovery

In all embodiments discussed so far, the possibility that there may be many different kinds of services coexisting in the same network has not been mentioned. As such a user may wish to query for just those discoverable services that offer certain capabilities. With the capability-based extension, the discoverable service and sandboxed programs provide service descriptions to the discovery service. To each query, the discovery service returns only those discoverable services within the same private network that also match the service description. The service description may take the form of a logical predicate or just a list of keywords. The capability-based extension can be used in conjunction with any other embodiment or extension in this application.

Only One Per Private Network

Only one discoverable service in each private network need announce to the discovery service. By definition each private network has its own routable private network address space in which nodes within the same private network can communicate with each other. With the only-one extension, discoverable services within the same private network elect one device at any given time to act as the announcer to the global discovery service and all discoverable services announce to the elected discoverable service. The elected discoverable service either passes all discovery information for the private network to the discovery service or it acts itself as the private discovery service for its private network. When acting as the private discovery service for its private network, the discoverable service can answer discovery queries for sandboxed programs running on nodes in the private discovery service's private network.

The only-one extension is not safe on networks that exhibit the hidden terminal problem, i.e., networks in which visibility is not guaranteed to be transitive. This sometimes occurs in wireless networks, e.g., node A has strong enough signal to communicate with node B, node B can communicate with node C, but A and C are too far apart for their signals to reach each other and B is not configured to act as a router between A and C. Fortunately, the discoverable service can know if it is on a network that exhibits the hidden terminal problem and choose to not implement the only-one extension.

With the only-one extension, load on the central discovery service from announces grows linear in the number of private networks rather than linear to the number of discoverable services. Furthermore, with the only-one extension, if a sandboxed program already knows the elected discovery service from a prior discovery query then it need not contact the central discovery service at all as long as the elected discovery service remains operational and remains the elected discovery service.

With the referral extension to the only-one extension, a discoverable service that was previously the private discovery service is queried it either redirects the requestor or forwards the request (like with DNS iterative vs recursive name resolution) to the current private discovery service if known. If no private discovery service can be found then the sandboxed program falls back to the central discovery service.

Discovering Undiscoverable Services

Discoverable services as defined in this application are discoverable because they implement one of the many embodiments described. In particular embodiments, discoverable services announce either to the central discovery service or a private discovery service (see only-one extension).

There may exist services within the network that are undiscoverable as defined in this application but are discoverable by other means such as DLNA (via UPnP AV). Such services are not discoverable directly from within sandboxed programs because they do not implement sandbox-reachable interfaces. However a discoverable service implementing the gateway-extension acts as a gateway to other undiscoverable services by announcing on their behalf to the central (or private) discovery service and by providing a sandbox-reachable interface on their behalf.

With the only-one gateway extension, the discoverable services implementing the gateway extension elect a single discoverable service to act as the gateway.

In this manner, a discoverable TV could allow flash players to push video to a user's "undiscoverable" NAS device.

Extending Sandbox to Support Discovery

An alternative solution is to extend an existing system that implements a sandbox to perform any traditional discovery method including those that involve multicast, such as MDNS/DNS-SD, SSDP, or SLP.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method of a trusted sandbox, the method comprising:
transmitting a discovery request that includes a first public internet protocol (IP) address for a trusted sandbox to a discovery service;
receiving, from the discovery service, information about a service offered by a first device including at least one of a globally unique identifier for the service offered by the first device, a name for the service, a private address of the service and a second public IP address for the first device in response to the discovery service determining the first public IP address and the second public IP address are identical;

transmitting the name of the service offered by the first device to an untrusted sandbox;

facilitating a communication of a service request from the untrusted sandbox to the first device using the private address for the first device; and facilitating a generation of a targeted advertisement in the untrusted sandbox based on a pseudonym derived from a hardware address of a user of the untrusted sandbox and an associated behavior of the user in communicating with the first device.

2. The method of claim 1, further comprising:

replacing the globally unique identifier for the service offered by the first device with a locally unique identifier that is local in scope to the untrusted sandbox; and wherein transmitting the name further comprises transmitting the locally unique identifier corresponding to the service offered by the first device to the untrusted sandbox.

3. The method of claim 2, wherein the service request includes the locally unique identifier to identify the service for the trusted sandbox and a payload.

4. The method of claim 1, further comprising issuing an access token received from the first device to the untrusted sandbox that uniquely identifies the untrusted sandbox; and wherein service requests from the untrusted sandbox are forwarded to the first device contingent upon the service requests including the access token.

5. The method of claim 1, wherein the globally unique identifier uniquely identifies the service offered by the first device if at least one of the second public IP address and a port for the first device changes.

6. The method of claim 1, further comprising receiving permission from the service offered by the first device to communicate the arbitrary messages.

7. The method of claim 1, wherein at least one of a multicast, a multicast domain name system (MDNS), a simple service discovery protocol (SSDP) and a service location protocol (SLP) is used to discover information about the service.

8. The method of claim 1, further comprising:

forwarding the service request to a global message queue associated with the service offered by the first device that stores the service request as a message.

9. The method of claim 1, wherein a network address translator to translate the first public IP address for the trusted sandbox and to generate the second public IP address for the first device by mapping at least one first private IP address to an IP address on the network address translator's public-facing network interface.

10. The method of claim 1, wherein the discovery request specifies a type of service.

11. The method of claim 1, further comprising querying a policy database to determine access restrictions for a first content provider website associated with the untrusted sandbox.

12. The method of claim 1, further comprising caching the information about the service offered by the first device in the trusted sandbox for reuse on a second content provider website.

13. A system for communicating arbitrary messages, the system comprising:

a processor; and a trusted sandbox stored on a memory and executed by the processor, the trusted sandbox for transmitting a discovery request that includes a first public internet protocol (IP) address for the trusted sandbox to a discovery service for receiving, from the discovery service, information about a service offered by a first device including at least one of a globally unique identifier for the service offered by the first device, a name for the service, a private address of the service and a second public IP address for the first device in response to the discovery service determining the first public IP address and the second public IP address are identical, for transmitting the name of the service offered by the first device to an untrusted sandbox, for facilitating a communication of a service request from the untrusted sandbox to the first device using the private address for the first device and for facilitating a generation of a targeted advertisement in the untrusted sandbox based on a pseudonym derived from a hardware address of a user of the untrusted sandbox and an associated behavior of the user in communicating with the first device.

14. The system of claim 13, wherein the trusted sandbox replaces the globally unique identifier for the service offered by the first device with a locally unique identifier that is local in scope to the untrusted sandbox and transmits the name and the locally unique identifier corresponding to the service offered by the first device to the untrusted sandbox.

15. The system of claim 14, further comprising:

the untrusted sandbox that is coupled to the trusted sandbox, the untrusted sandbox for including the locally unique identifier to identify the service for the trusted sandbox and a payload in the service request.

16. The system of claim 13, wherein the trusted sandbox issues an access token received from the first device to the untrusted sandbox that uniquely identifies the untrusted sandbox and forwards service requests from the untrusted sandbox to the first device contingent upon the service requests including the access token.

17. The system of claim 13, wherein the trusted sandbox receives permission from the service offered by the first device to communicate the arbitrary messages.

18. The system of claim 13, wherein at least one of a multicast, a multicast domain name system (MDNS), a simple service discovery protocol (SSDP) and a service location protocol (SLP) is used to discover information about the service.

19. The system of claim 13, wherein the trusted sandbox forwards the service request to a global message queue associated with the service offered by the first device that stores the service request as a message.

20. A computer program product comprising a non-transitory computer useable medium including a computer readable program, wherein the computer readable program when executed on a computer causes the computer to perform steps comprising:

transmitting a discovery request that includes a first public internet protocol (IP) address for a trusted sandbox to a discovery service;

receiving, from the discovery service, information about a service offered by a first device including at least one of a globally unique identifier for the service offered by the first device, a name for the service, a private address of the service and a second public IP address for the first device in response to the discovery service determining the first public IP address and the second public IP address are identical;

transmitting the name of the service offered by the first device to an untrusted sandbox;

facilitating a communication of a service request from the untrusted sandbox to the first device using the private address for the first device; and facilitating a generation of a targeted advertisement in the untrusted sandbox based on a pseudonym derived from a hardware address of a user of the untrusted sandbox and an associated behavior of the user in communicating with the first device.

\* \* \* \* \*